(12) United States Patent
Waksugi

(10) Patent No.: US 7,924,467 B2
(45) Date of Patent: Apr. 12, 2011

(54) IMAGE FORMING APPARATUS

(75) Inventor: Nobuo Waksugi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 611 days.

(21) Appl. No.: 11/686,488

(22) Filed: Mar. 15, 2007

(65) Prior Publication Data

US 2007/0216917 A1  Sep. 20, 2007

(30) Foreign Application Priority Data

Mar. 16, 2006  (JP) .................................. 2006-072408

(51) Int. Cl.
    *H04N 1/405*  (2006.01)
(52) U.S. Cl. ........................... 358/3.2; 358/3.16; 358/1.9
(58) Field of Classification Search .................... 358/1.9, 358/2.1, 3.06, 3.16, 3.2
    See application file for complete search history.

(56) References Cited

U.S. PATENT DOCUMENTS 7,494,202 B2 * 2/2009 Sato ................................. 347/11

FOREIGN PATENT DOCUMENTS

| EP | 0663759 A1 | 7/1995 |
| EP | 1487191 A2 | 12/2004 |
| JP | 11-34399 A | 2/1999 |
| JP | 2005-22410 A | 1/2005 |

* cited by examiner

*Primary Examiner* — Thomas D Lee
*Assistant Examiner* — Stephen M Brinich
(74) *Attorney, Agent, or Firm* — Panitch Schwarze Belisario & Nadel LLP

(57) ABSTRACT

An image forming apparatus prints a first image data rendered at a first number of halftone levels based on a second image data rendered at a second number of halftone levels larger than the first number of halftone levels. A dot forming section forms lines of pixels on a print medium, the lines including a number of groups of sub lines of sub dots. The groups are aligned such that the sub lines of sub dots extend in traverse directions substantially perpendicular to an advance direction. A controller controls the dot forming section such that a selected number of sub dots in the advance direction are combined to form a pixel. Sub dots on the same sub line have the same exposure energy and sub dots on different sub lines in the same pixel have different exposure energies.

9 Claims, 32 Drawing Sheets

FIG.9

| COUNT OF GROUP COUNTER | COUNT OF SUB LINE COUNTER | HALFTONE LEVELS | | | | | | | |
|---|---|---|---|---|---|---|---|---|---|
| | | 0 | 1 | 2 | 3 | 4 | 5 | 6 |
| 0 | 0 | 0 | 1 | 0 | 1 | 1 | 1 | 1 |
| | 1 | 0 | 0 | 1 | 1 | 1 | 1 | 1 |
| 1 | 0 | 0 | 0 | 0 | 0 | 1 | 0 | 1 |
| | 1 | 0 | 0 | 0 | 0 | 0 | 1 | 1 |

FIG.11

| GROUP | SUB LINE | HALFTONE LEVELS | | | | | | |
|---|---|---|---|---|---|---|---|---|
| | | 0 | 1 | 2 | 3 | 4 | 5 | 6 |
| GROUP=0 | SUB LINE=0 | | ○ | | ○ | ○ | ○ | ○ |
| GROUP=0 | SUB LINE=1 | | | ◯ | ◯ | ◯ | ◯ | ◯ |
| GROUP=1 | SUB LINE=0 | | | | | ○ | | ○ |
| GROUP=1 | SUB LINE=1 | | | | | | ◯ | ◯ |

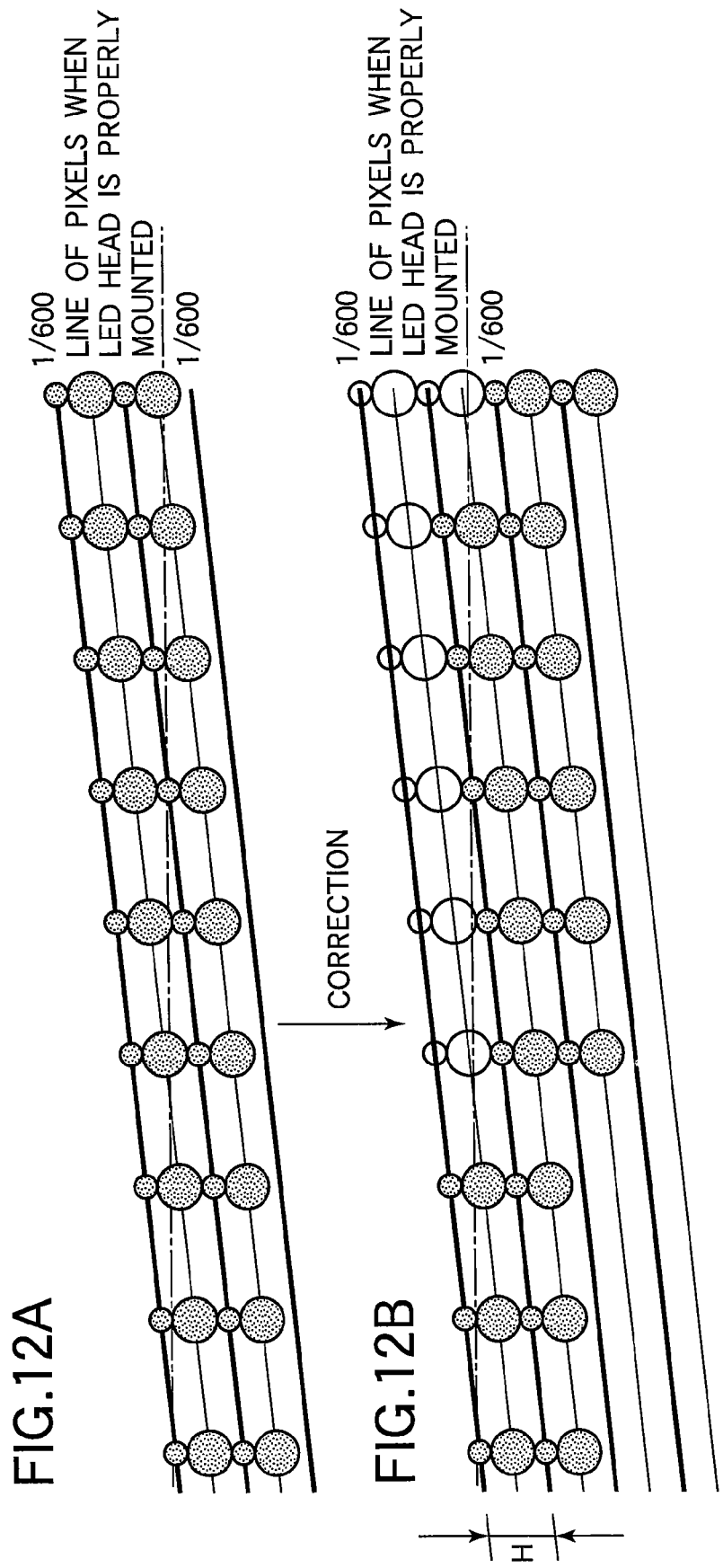

CONVENTIONAL ART

LINE OF PIXELS
WHEN LED HEAD
IS PROPERLY
MOUNTED

FIG.17

| GROUP COUNTER | SUB LINE COUNTER | HALFTONE LEVELS | | | | | | | | | | | | | | |
|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 |
| 0 | 0 | 0 | 1 | 0 | 1 | 0 | 1 | 0 | 1 | 1 | 1 | 1 | 1 | 1 | 1 | 1 |
| 0 | 1 | 0 | 0 | 1 | 1 | 0 | 0 | 1 | 1 | 1 | 1 | 1 | 1 | 1 | 1 | 1 |
| 0 | 2 | 0 | 0 | 0 | 0 | 1 | 1 | 1 | 1 | 1 | 1 | 1 | 1 | 1 | 1 | 1 |
| 1 | 0 | 0 | 0 | 0 | 0 | 0 | 0 | 0 | 0 | 1 | 0 | 1 | 0 | 1 | 0 | 1 |
| 1 | 1 | 0 | 0 | 0 | 0 | 0 | 0 | 0 | 0 | 0 | 1 | 1 | 0 | 0 | 1 | 1 |
| 1 | 2 | 0 | 0 | 0 | 0 | 0 | 0 | 0 | 0 | 0 | 0 | 0 | 1 | 1 | 1 | 1 |

FIG.19

| GROUP/SUB LINE | HALFTONE LEVELS | | | | | | | | | | | | | | |
|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 |
| GROUP=0, SUB LINE=0 | | ○ | | ○ | | ○ | | | ○ | ○ | ○ | ○ | ○ | ○ | ○ |
| GROUP=0, SUB LINE=1 | | | ○ | ○ | ○ | ○ | ○ | ○ | ○ | ○ | ○ | ○ | ○ | ○ | ○ |
| GROUP=0, SUB LINE=2 | | | | | | | | ○ | ○ | ○ | ○ | ○ | ○ | ○ | ○ |
| GROUP=1, SUB LINE=0 | | | | | | | | | | | | | | | |
| GROUP=1, SUB LINE=1 | | | | | | | | | ○ | ○ | ○ | | | ○ | ○ |
| GROUP=1, SUB LINE=2 | | | | | | | | | | | | ○ | ○ | | |

FIG.24

| GROUP COUNTER | SUB LINE COUNTER | HALFTONE LEVELS | | | | | | | | | |
|---|---|---|---|---|---|---|---|---|---|---|---|
| | | 0 | 1 | 2 | 3 | 4 | 5 | 6 | 7 | 8 | 9 |
| 0 | 0 | 0 | 1 | 0 | 1 | 1 | 1 | 1 | 1 | 1 | 1 |
| 0 | 1 | 0 | 0 | 1 | 1 | 1 | 1 | 1 | 1 | 1 | 1 |
| 1 | 0 | 0 | 0 | 0 | 0 | 1 | 0 | 1 | 1 | 1 | 1 |
| 1 | 1 | 0 | 0 | 0 | 0 | 0 | 1 | 1 | 1 | 1 | 1 |
| 2 | 0 | 0 | 0 | 0 | 0 | 0 | 0 | 0 | 1 | 0 | 1 |
| 2 | 1 | 0 | 0 | 0 | 0 | 0 | 0 | 0 | 0 | 1 | 1 |

FIG.26

| GROUP/SUB LINE | HALFTONE LEVELS | | | | | | | | | |
|---|---|---|---|---|---|---|---|---|---|---|
| | 0 | 1 | 2 | 3 | 4 | 5 | 6 | 7 | 8 | 9 |
| GROUP=0, SUB LINE=0 | | ○ | | ○ | ○ | ○ | ○ | ○ | ○ | ○ |
| GROUP=0, SUB LINE=1 | | | ○ | ○ | ○ | ○ | ○ | ○ | ○ | ○ |
| GROUP=1, SUB LINE=0 | | | | | ○ | ○ | ○ | ○ | ○ | ○ |
| GROUP=1, SUB LINE=1 | | | | | | ○ | ○ | ○ | ○ | ○ |
| GROUP=2, SUB LINE=0 | | | | | | | | ○ | ○ | ○ |
| GROUP=2, SUB LINE=1 | | | | | | | | | ○ | ○ |

FIG.29

| GROUP COUNTER | SUB LINE COUNTER | HALFTONE LEVELS | | | |
|---|---|---|---|---|---|
| | | 0 | 1 | 2 | 3 |
| 0 | 0 | 0 | 1 | 0 | 1 |
| 0 | 1 | 0 | 0 | 1 | 1 |
| 1 | 0 | 0 | 0 | 0 | 0 |
| 1 | 1 | 0 | 0 | 0 | 0 |

FIG.30

| GROUP/SUB LINE | HALFTONE LEVELS | | | |
|---|---|---|---|---|
| | 0 | 1 | 2 | 3 |
| GROUP=0, SUB LINE=0 | | ○ | | ○ |
| GROUP=0, SUB LINE=1 | | | ○ | ○ |
| GROUP=1, SUB LINE=0 | | | | |
| GROUP=1, SUB LINE=1 | | | | |

CONVENTIONAL ART

LINE OF PIXELS
WHEN LED HEAD
IS PROPERLY
MOUNTED

CONVENTIONAL ART

LINE OF PIXELS
WHEN LED HEAD
IS PROPERLY
MOUNTED

IMAGE FORMING APPARATUS

BACKGROUND OF THE INVENTION

1. Field of the Invention

The present invention relates to an image forming apparatus such as an electrophotographic printer, and more particularly to an image forming apparatus including a write head that writes dots in accordance with halftone data.

2. Description of the Related Art

Exposing units for conventional electrophotographic printers are generally of two types: a scanning type head with a light source such as a laser and an LED head having a large number of light emitting diodes (LEDs) aligned in line. A laser head is capable of changing the size of dots from dot to dot in the same scanning line. In contrast, an LED head is usually not capable of readily changing the size of dots from dot to dot in the same scanning line. In order to overcome the drawback of an LED head, it has been proposed to form a line of halftone pixels by combining sub dots formed in a plurality of sub-lines. Dots on the same sub line have the same exposure energy and dots on different sub lines in the same pixel have different exposure energies. Combining dots having different sizes on sub lines implements a desired halftone pixel.

A tandem type color printer incorporates a plurality of LED heads, each LED head illuminating the charged surface of a corresponding photoconductive drum to form an electrostatic latent image of a corresponding color. The electrostatic latent image is then developed with a toner of the corresponding color. Images of the respective colors are transferred in sequence onto a piece of paper one over the other in registration to form a full color toner image. The LED heads may be mounted with some positional errors, so that the line of LEDs extends somewhat obliquely with respect to the rotational axis of the photoconductive drum. Thus, a tandem type color printer may suffer from a problem in that when the toner images of the respective colors are transferred onto the paper one over the other, the toner images are shifted. Japanese patent application Laid-Open JP11-34399A discloses a technique for minimizing misregistration of images of respective colors in an advance direction (direction of travel of the paper). Data received from a host apparatus is temporarily stored in an image memory. Data for one line is read from the image memory such that the data is a combination of data from a plurality of lines in accordance with the positional errors of the LED heads. Then, the data read from the image memory is transmitted to the LED head on a line-by-line basis. In this manner, misregistration of the printed images in the traversing direction is minimized.

FIG. 32 illustrates dots printed on paper in conventional halftoning without correction when an LED head is misaligned so that the LED head extends at an angle with a rotational axis of a photoconductive drum. Printing was performed without positional correction in the advance direction by a conventional halftone printing technique. Each dot or pixel is formed of three sub-dots rendered at different halftone levels. The LEDs in the LED head are energized at three consecutive timings to form three sub lines, such that dots on the same sub line have the same exposure energy and dots on different sub lines in the same pixel have different exposure energies.

Referring to FIG. 32, the positions of sub dots in the advance direction are off the line on which the sub dots should be, due to the fact that the LED head is not accurately perpendicular to the advance direction of paper. Because each pixel is formed of three different sub-dots, the position of each pixel requires correction of the positions of three sub-dots.

FIG. 33 illustrates one way of correcting the positional errors of sub dots in which the positions of sub-dots indicated by dotted lines are corrected by 3 sub-lines. Because the correction is coarse, the resulting sub-dots still deviate from where they should be. This correction is insufficient to reduce color shift when a plurality of images of different colors are superposed.

SUMMARY OF THE INVENTION

An object of the invention is to provide an image forming apparatus with improved correction accuracy for correcting the orientation of an LED head.

Another object of the invention is to provide an image forming apparatus with reduced color shift that would otherwise be caused when images of different colors are superposed.

An image forming apparatus prints first image data rendered at a first number of halftone levels. A dot forming section forms a line of pixels on a print medium. Each of the lines includes a number of groups of sub lines, and each of the sub lines including sub dots. The groups are aligned such that the sub lines extend in first directions substantially perpendicular to a second direction in which the print medium advances. A controller controls the dot forming section such that a selected number of sub dots in the second direction are combined to form the pixel based on second image data rendered at a second number of halftone levels larger than the first number of halftone levels, sub dots on the same sub line having the same exposure energy and sub dots on different sub lines in the same pixel having different exposure energies.

The dot forming section includes a halftone level converting section, a digitizing section, a bi-level image memory, an exposing section, and a data outputting section. The halftone level converting section converts the second image data rendered at the second number of halftone levels into the first image rendered at the first number of halftone levels. A digitizing section digitizes the first image into bi-level image data. A bi-level image memory stores the bi-level image data. An exposing section causes light-emitting elements to emit light in accordance with the bi-level image data. A data outputting section reads the bi-level image data from the bi-level image memory and produces signals that represents corresponding ones of the different exposure energies, the data outputting section sending the bi-level data and the signals to the exposing section.

The second image data includes a third number of lines of pixels for one page of the print medium, each of the third number of lines including a fourth number of pixels that are aligned in the first direction.

The third number of lines includes a fifth number of sub lines. Each of the sub dots on the sub lines is printed at a position on the print medium given by a first coordinate in the first direction and a second coordinate in the second direction. When the data outputting section reads the bi-level data from the bi-level image memory, the position in the second direction is corrected by a correction value corresponding to the position. The correction value is produced in increment of the pacing between adjacent groups.

The first number of halftone levels, the number of groups, and a number of sub lines are related such that $$M \leq (2^S - 1) \times G + 1$$

where M is the first number of halftone levels, G is the number of groups, and S is the number of sub lines.

The number of groups may be 2, the number of sub lines in each group may be 2, and the first number of halftone levels may be 7.

The number of groups may be 2, the number of sub lines in each group may be 3, and the first number of halftone levels may be 15.

The number of groups may be 3, the number of sub lines in each group may be 2, and the first number of halftone levels (M) may be 10.

The number of groups may be 2, the number of sub lines in each group may be 2 and the first number of halftone levels may be 4.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 9 illustrates the truth table for a data decoder of the first embodiment;

FIG. 11 illustrates the patterns of sub dots rendered at 7 different halftone levels;

FIG. 12A illustrates a comparative example in which no correction was made;

FIG. 12B illustrates print results of 3-bit image data rendered at 7 halftone levels when the bi-level image data is outputted according to the timing chart in FIG. 10;

FIG. 17 illustrates the truth table for a data decoder;

FIG. 19 illustrates the patterns of sub dots rendered at 15 different halftone levels;

FIG. 24 illustrates the truth table for the data decoder;

FIG. 26 illustrates the patterns of sub dots rendered at 10 different halftone levels;

FIG. 29 illustrates the truth table for a data decoder of the fourth embodiment;

FIG. 30 illustrates the patterns of sub dots for the respective halftone levels when printing of data rendered at 4 halftone levels is performed according to the timing chart in FIG. 10;

DETAILED DESCRIPTION OF THE INVENTION

First Embodiment

Figure 1:
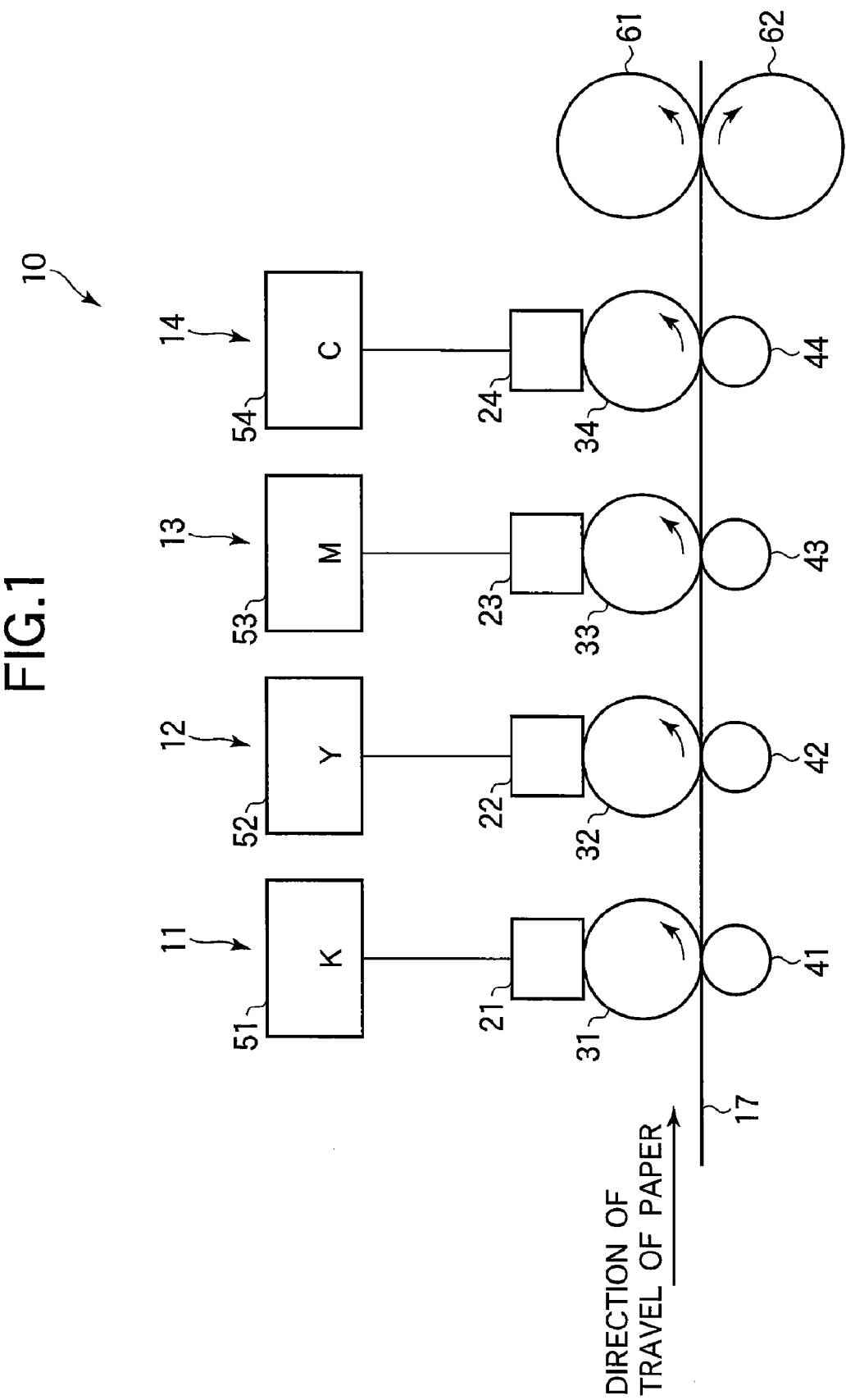
FIG. 1 illustrates a general configuration of an image forming apparatus of a first embodiment.

FIG. 1 illustrates a general configuration of an image forming apparatus of a first embodiment.

An image forming apparatus 10 is a color electrophotographic printer that includes four image forming sections 11-14 for forming toner images of black (K), yellow (Y) magenta (M), and cyan (C). Each image forming section incorporates an LED head. The image forming apparatus also includes heat rollers 61 and 62 for fixing the toner images under heat and pressure.

The image forming section 11 for black image includes an image controller 51, an LED head 21, a photoconductive drum 31, and a transfer roller 41.

The image forming section 12 for yellow image includes an image controller 52, an LED head 22, a photoconductive drum 32, and a transfer roller 42.

The image forming section 13 for magenta image includes an image controller 53, an LED head 23, a photoconductive drum 33, and a transfer roller 43.

The image forming section 14 for cyan image includes an image controller 54, an LED head 24, a photoconductive drum 34, and a transfer roller 44.

The image forming sections 11-14 are aligned along a transport path in which recording paper 17 is transported, so that the photoconductive drums 31-34 are aligned along the transport path from upstream to downstream of the transport path. Each of the image forming sections 11-14 may be substantially identical; for simplicity, only the operation of the image forming section 11 for black will be described, it being understood that the other image forming sections may work in a similar fashion.

The photoconductive drum 31 rotates about a rotational axis substantially transverse to an advance direction (a direction of travel of the recording paper). A motor (not shown) drives the photoconductive drum 31 in rotation.

The photoconductive drum 31 has a length longer than the width of the largest size paper. A charging section (not shown) uniformly charges the surface of the photoconductive drum 31. The LED head 21 is disposed in the vicinity of the photoconductive drum 31, and includes a plurality of LEDs 316 (FIG. 3) aligned in a line substantially parallel to the rotational axis of the photoconductive drum 31. When the LEDs are energized in accordance with image data, the LED head 21 illuminates the charged surface of the photoconductive drum 31 to form an electrostatic latent image. The controller 51 receives print data from an external host apparatus, and controls the LEDs to be energized in accordance with the image data produced based on the print data.

The transfer roller 41 is disposed to form a transfer point between the photoconductive drum 31 and the transfer roller 41 such that a toner image is transferred onto the paper 17 as the paper 17 passes through the transfer point. As the paper 17 passes through the succeeding image forming sections, yellow, magenta, and cyan toner images are transferred onto the paper 17 in registration to form a full color toner image. Then, the paper 17 advances to a fixing point defined between the heat rollers 61 and 62. As the paper 17 passes through the fixing point, the full color toner image is fused into the paper 17 under heat and pressure.

A halftoning technique according to the present invention will be described. The technique will be described with respect to a technique in which a pixel is halftoned by selectively forming the sub dots having different sizes on a plurality of sub lines.

{Position of Pixels and Dots}

Figure 4:
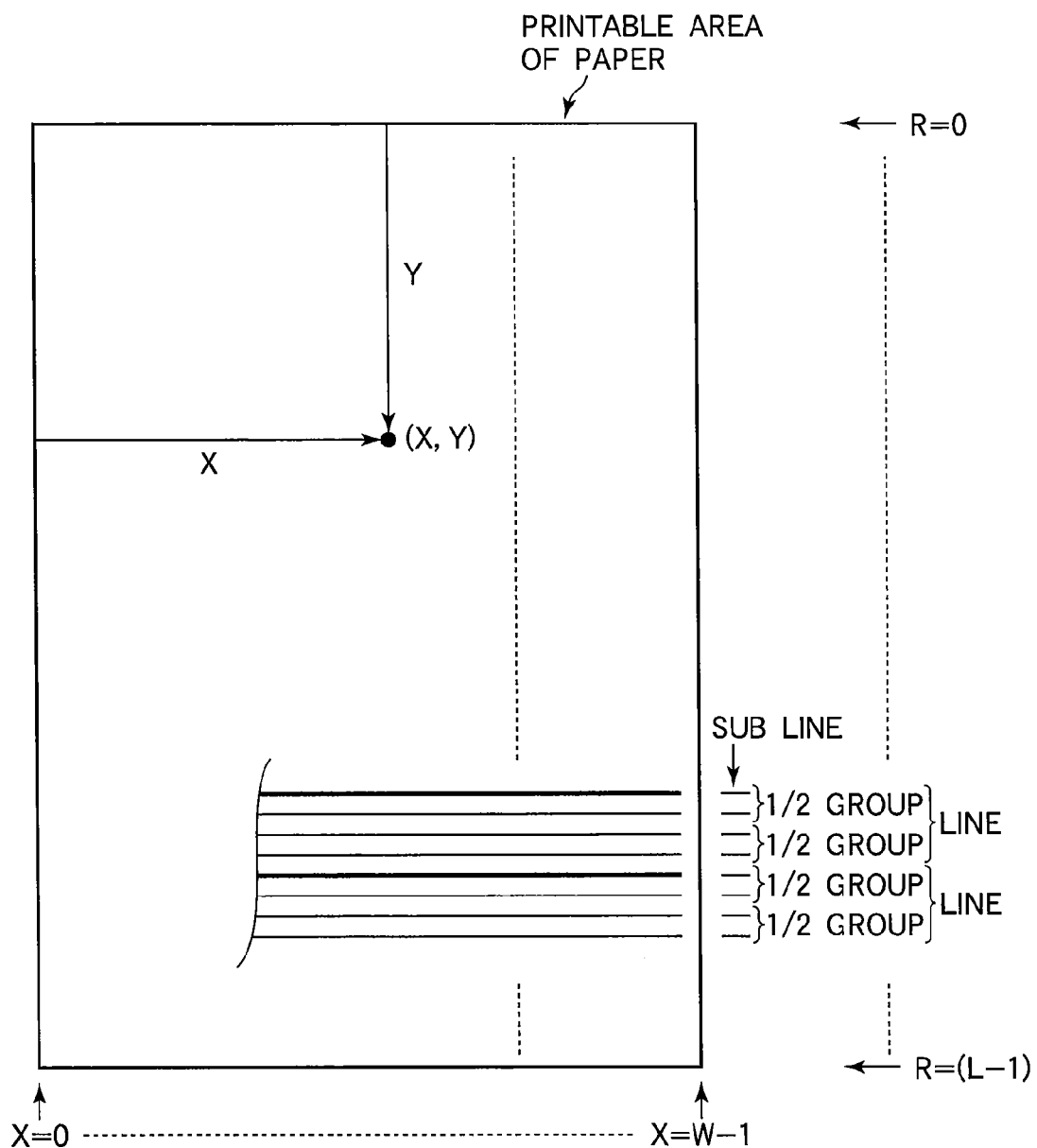
FIG. 4 illustrates the data structure of image data and how the image data is printed on paper.

FIG. 4 illustrates the data structure of image data and how the image data is printed on the paper 17.

Because the image forming apparatus 10 is a line printer, the image data includes a total of L lines (R=0 to L−1) of pixels for a printable area of one page of the paper 17. Each line includes two groups of sub lines, each group including two sub lines. Each sub line includes a total of W dots (X=0 to X=W−1). The lines from R=0 to R=L−1 are aligned on a vertical direction and sub lines extend in a horizontal direction. Each pixel is formed by combining dots on the sub lines. The Cartesian coordinate is employed to define the positions of dots printed on the paper 17, e.g., the coordinate of a dot is expressed by (X,Y). Dots on the Y-axis (ordinate) are aligned from top to bottom and dots on the X-axis (abscissa) are aligned left to right of the paper 17.

A line counter 212 (FIG. 2) counts the number of lines starting from the top end of the page to the bottom end of the printable area of the paper 17, i.e., from R=0 to R=(L−1). A group counter 213 (FIG. 2) counts the number of groups in each line, i.e., Cg=0 to 1. A sub line counter 214 (FIG. 2) counts the number of sub lines in each group, i.e., Cs=0 to 1.

Dots on the same sub line have the same exposure energy and dots on different sub lines in the same pixel have different exposure energies.

Figure 2:
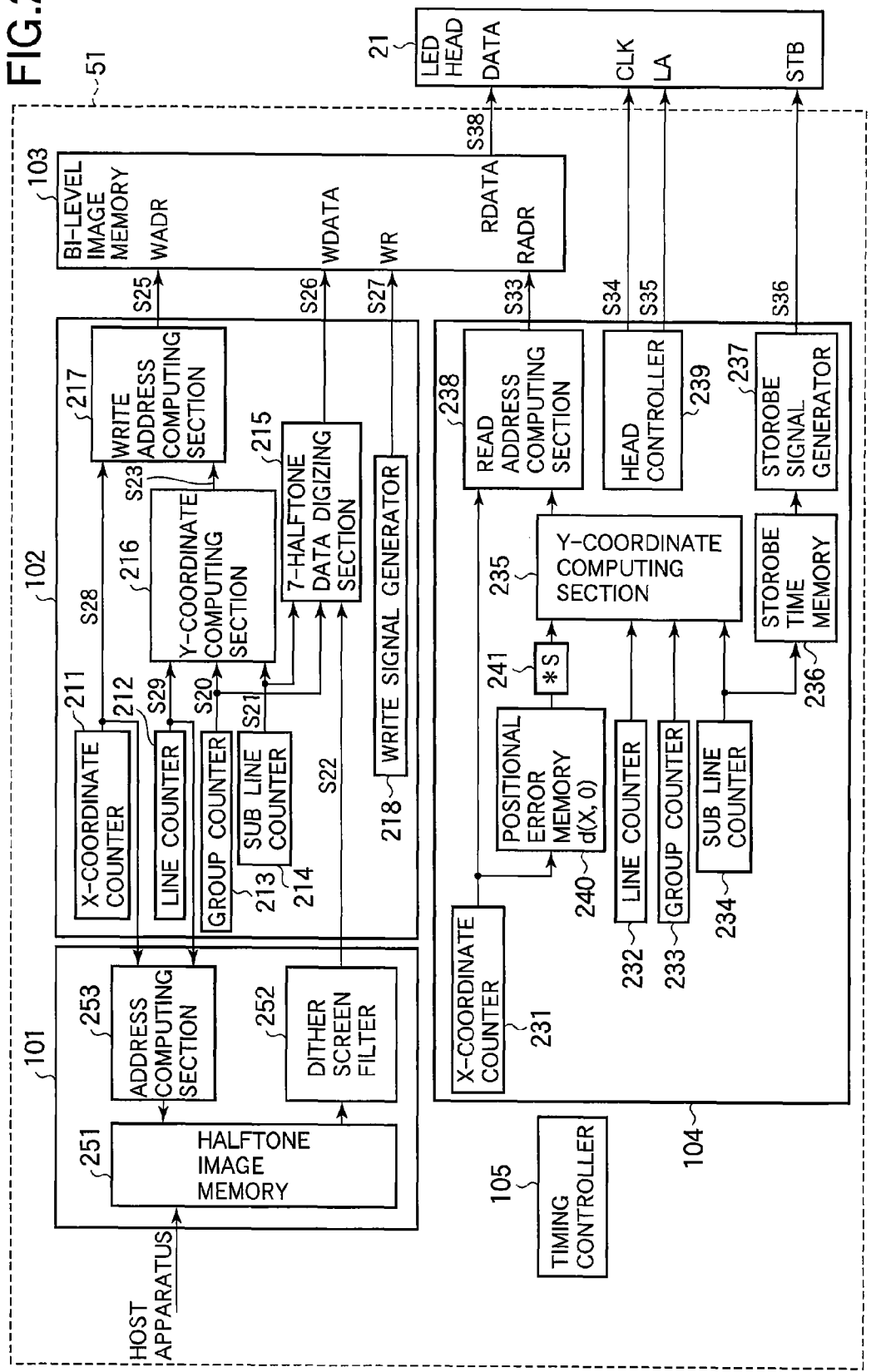
FIG. 2 is a block diagram illustrating sections in a controller.

FIG. 2 is a block diagram illustrating the sections in the controller 51.

A data processing section 101 receives 8-bit image data (in 256 halftone levels) from a host apparatus such as a personal computer (not shown), and processes the received the 8-bit image data. A digitizing section 102 receives image rendered at 7 halftone levels from the data processing section 101, and digitizes the image into digital form (i.e., bi-level data). A bi-level image memory 103 stores the bi-level data for one page of paper 17. A data outputting section 104 reads the bi-level data from the bi-level image memory 103, and sends the bi-level data to the LED head 21. The LEDs in the LED head 21 are energized in accordance with the bi-level data. A timing controller 105 controls all the timings for the entire system.

{Data Processing Section}

A halftone image memory 251 temporarily stores the 8-bit image data rendered at 256 halftone levels, received from the host apparatus. A dither screen filter 252 converts the image data rendered at 256 halftone levels into image data rendered at 7 halftone levels, and outputs the image data rendered at 7 halftone levels to the digitizing section 102. An address computing section 253 computes addresses of the halftone image memory 251 for reading the 8-bit image data from the halftone image memory.

The dither screen filter 252 may be of any conventional filter. The image data rendered at 7 halftone levels is expressed by 3 bits. Conversion of the 8-bit image data into the 3-bit image data is advantageous in that the digitizing section 102 requires a smaller memory capacity.

{Digitizing Section}

A write address computing section 217 computes write addresses of the halftone image memory 103. A digitizing section 215 converts the image data rendered at 7 halftone levels, received from the data processing section 101, into digital form. A write signal generator 218 generates a write signal. The write address computing section 217 communicates data and signals with an X-coordinate counter 211, a line counter 212, a group counter 213, a sub-line counter 214, and a Y-coordinate computing section 216.

The write address is computed based on the count of the X-coordinate counter 211 and the output of the Y-coordinate computing section 216. Thus, a Y-coordinate indicates the position of a sub-line relative to the top end of the printable area of the paper 17 while the count of the X-coordinate counter 211 represents the position of a pixel from the left end of the printable area of the paper 17. The X-coordinate counter 211 counts from 0 to (W−1) where W is a total number of pixels on the X-axis. The Y-coordinate computing section 216 computes a Y-coordinate based on the counts of the line counter 212, the group counter 213, and the sub-line counter 214 as follows:

$$Y\text{-coordinate}(R)=R{\times}S{\times}G+Cg{\times}S+Cs \qquad \text{Eq. (1)}$$

where R is the count of the line counter 212, S is the number of sub lines, G is the number of groups, Cg is the count of the group counter 213, and Cs is the count of the sub line counter 214.

In the first embodiment, G is 2, and S is 2.

The write address computing section 217 computes a signal S25 indicative of a write address WADR as follows:

$$WADR=Y\text{-coordinate}{\times}W+Cx$$

where Cx is the count of the X-coordinate counter 211.

In other words, the write address WADR represents the position of a dot, which is a part of a pixel, in the printable area of the paper 17.

TABLE 1

| COUNTER | COUNTING OPERATION |
|---|---|
| SUB-LINE COUNTER | SUB-LINE COUNTER COUNTS SIGNAL FROM TIMING CONTROLLER 105 |
| GROUP COUNTER | GROUP COUNTER COUNTS UP UPON A CARRY FROM SUB LINE COUNTER |
| X-COORDINATE COUNTER | X-COORDINATE COUNTER COUNTS UP UPON A CARRY FROM GROUP COUNTER |
| LINE COUNTER | LINE COUNTER COUNTS UP WHEN THE COUNT OF X-COORDINATE COUNTER REACHES W-1 |

The count Cx (S28) of the X-coordinate counter 211 and the count R (S29) of the line counter 212 are sent to the address computing section 253 of the data processing section 101, which in turn computes the address for reading the 8-bit image data rendered at 256 halftone levels from the halftone image memory 251. The operations of the digitizing section 215 and the write signal generator 218 will be described later.

{Bi-Level Image Memory}

The bi-level image memory 103 is a memory having a write port and a read port. The write port receives the write address WADR (S25), write data WDATA (S26), and write signal WR (S27). The read port receives a read address RADR (S33), and outputs read data RDATA (S38). The bi-level image memory 103 stores 1-bit data that represents each of dots in the sub lines for each pixel.

{Data Outputting Section}

The data outputting section 104 computes the read address RADR (S33) and a strobe signal STB (S36) to be outputted to the LED head 21. The data outputting section 104 includes a head controller 239 that outputs a head clock CLK (S34) and a latch signal LA (S35) to the LED head 21.

{Outputting Read Address RADR}

A Y-coordinate computing section 235 computes a Y-coordinate based on the outputs of a line counter 232, a group counter 233, a sub line counter 234, and a positional error memory 240. A read address computing section 238 computes a read address (S33) based on the X-coordinate from the X-coordinate counter 231 and the Y-coordinate from the Y-coordinate computing section 235.

If the correction of the positions of dots is not performed, the Y-coordinate of the read address S33 may be computed as follows:

$$Y\text{-coordinate}(R)=R{\times}S{\times}G+Cg{\times}S+Cs$$

where R is the count of line counter 232, S is the number of sub lines, G is the number of groups, Cg is the count of group counter 233, and Cs is the count of sub line counter 234.

Figure 5:
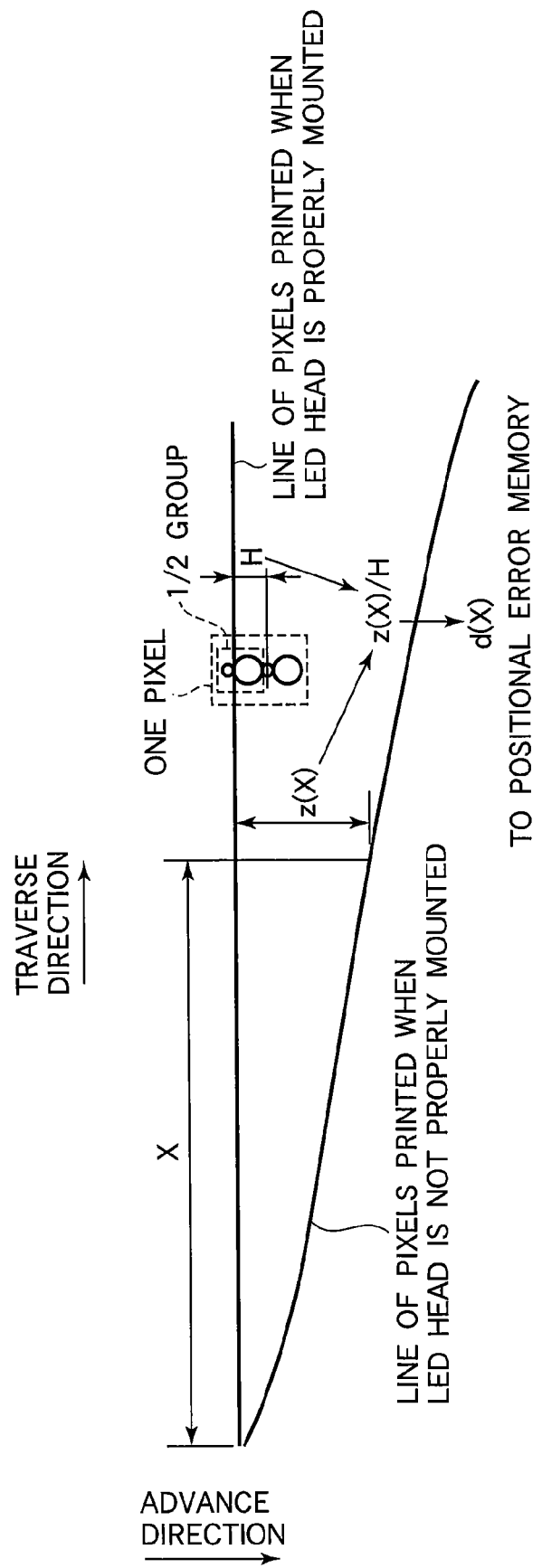
FIG. 5 illustrates the principle of correction of the position of dots before printing when the LED head extends in a direction at an angle with the rotational axis of the photoconductive drum due to some positional errors.

FIG. 5 illustrates the principle of correction of the position of dots before printing when the LED head 21 extends in a direction at an angle with the rotational axis of the photoconductive drum 31 due to some positional errors.

Referring to FIG. 5, the positions of pixels deviate from where they should be, due to the fact that the LED head 21 is mounted to extend in a direction at an angle with the rotational axis of the photoconductive drum. Thus, a dot at a coordinate "X" on the X-axis may be away from a Y-coordinate where it should be. The amount of this deviation is expressed by z(X).

In this embodiment, the correction of the positions of dots on the Y-axis is made in increment of a pitch H of the groups. In other words, d(Cx)=z(X)/H is expressed in terms of the number of groups from the top of the printable area of the paper 17, H being the spacing between adjacent groups and Cx being the count of the X-coordinate counter 231.

The value of d(Cx) is stored into the positional error memory 240, and is used in performing correction of the position sub-line by sub-line. When values of d(Cx)=z(X)/H are computed, fractions of 5 and over may be counted as a unit and the rest may be disregarded.

As described above, d(Cx) represents a deviation of a dot at an X-coordinate in the advance direction, expressed in terms of the number of groups. The positional error memory 240 outputs a value of d(Cx) corresponding to a count of the X-coordinate counter 231. The multiplier 241 computes a value of d(Cx)×S, and provides the multiplied value to the Y-coordinate computing section 235. It follows that the correction of the Y-coordinate is in increments of a group as described later.

The Y-coordinate computing section 235 computes a correction to the Y-coordinate as follows:

$$\text{Corrected } Y\text{-coordinate}(R)=R{\times}S{\times}G+Cg{\times}S+d(Cx){\times}S$$

where R is the count of line counter 232, S is the number of sub lines, G is the number of groups, Cg is the count of group counter 233, and Cx is the count of X-coordinate counter 231.

Figure 6:
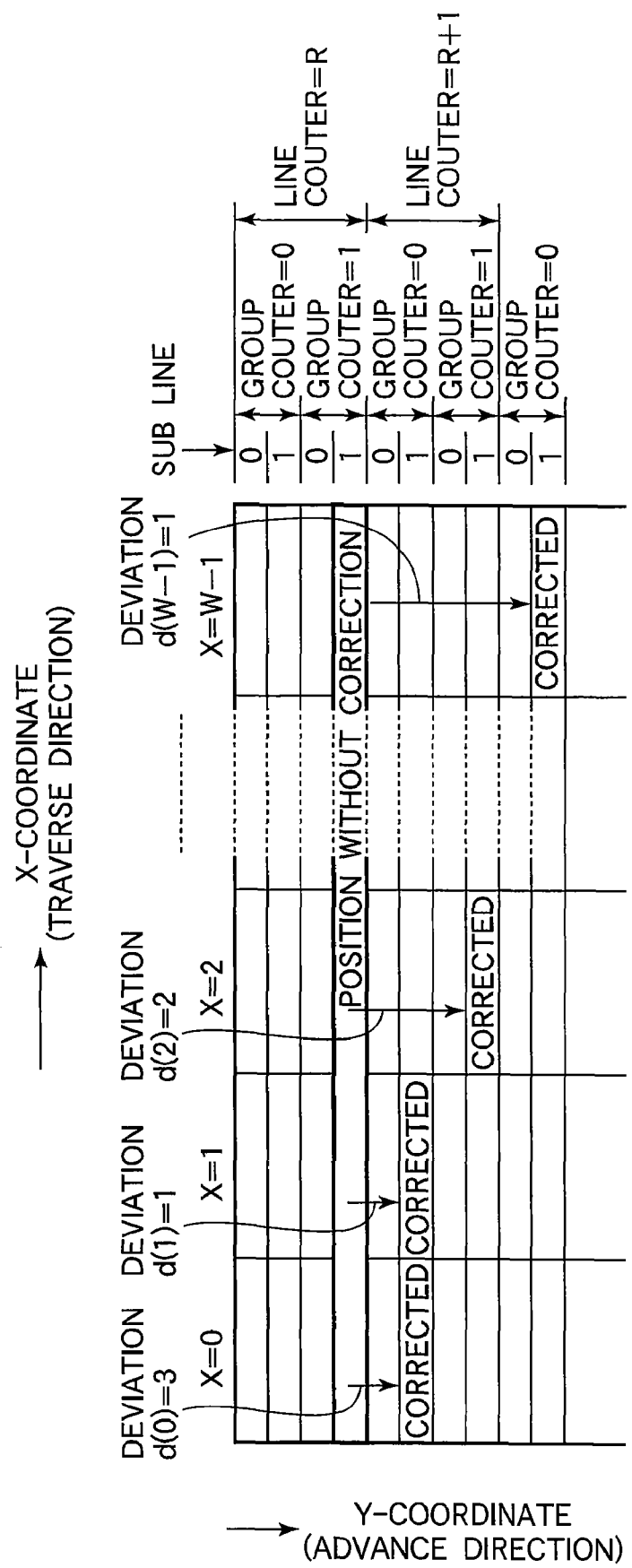
FIG. 6 illustrates the positional relation between a Y-coordinate before correction and the Y-coordinate after correction.

FIG. 6 illustrates the positional relation between the Y-coordinate before correction and the Y-coordinate after correction. Each of rectangular areas in FIG. 6 indicates a memory area in which bi-level image data is stored.

The bi-level image memory 103 has the same number of memory areas as pixels W in the traverse direction and the same number of memory areas as the sub lines in the advance direction. Assume a sub line expressed by a count "R" of the line counter 232, a count of "1" of the group counter 233, and a count of "1" of the sub line counter 234 is read out of the bi-level image memory 103. Then, the Y-coordinate before correction is given by R×S×G+1×S+1.

If correction is made to the Y-coordinate, a corrected Y-coordinate is given as follows:

$$\text{Corrected } Y\text{-coordinate}=R{\times}S{\times}G+1{\times}S+1.+d(Cx){\times}S$$

Thus, the read address computing section 238 computes a read address RADR (S33) when correction is made in the advance direction (direction of travel of the paper 17) as follows:

$$RADR=(\text{corrected } Y\text{-coordinate}){\times}W+Cx \qquad \text{Eq (3)}$$

where Cx is the count of X-coordinate counter 231.

{Sending Strobe Signal to LED Head}

A strobe signal generator 237 cooperates with a strobe time memory 236 to produce a strobe signal. The strobe time memory 236 stores the same number of items of strobe time data as the sub lines in one group such that the strobe time T (i.e., duration) of the strobe signal STB may be set depending on the sub lines. When the count Cs of the sub line counter 234 addresses the strobe time memory 236, the strobe time memory 236 outputs the data describing the strobe time T to the strobe signal generator 237. Upon receiving a triggering signal from the timing controller 105, the strobe signal generator 237 reads the strobe time T from the strobe time memory 236, and then provides the strobe signal STB (S36) corresponding to the strobe time T to the LED head 21.

{Timing Controller}

The timing controller 105 administrates the timings for the overall system, and outputs control signals (not shown) including clocks to the sub line counter 234 in the data outputting section 104, clocks to the X-coordinate counter 231 in the data outputting section 104, the triggering signal for the strobe signal generator 237, and a triggering signal for the LED head write controller 239.

Figure 3:
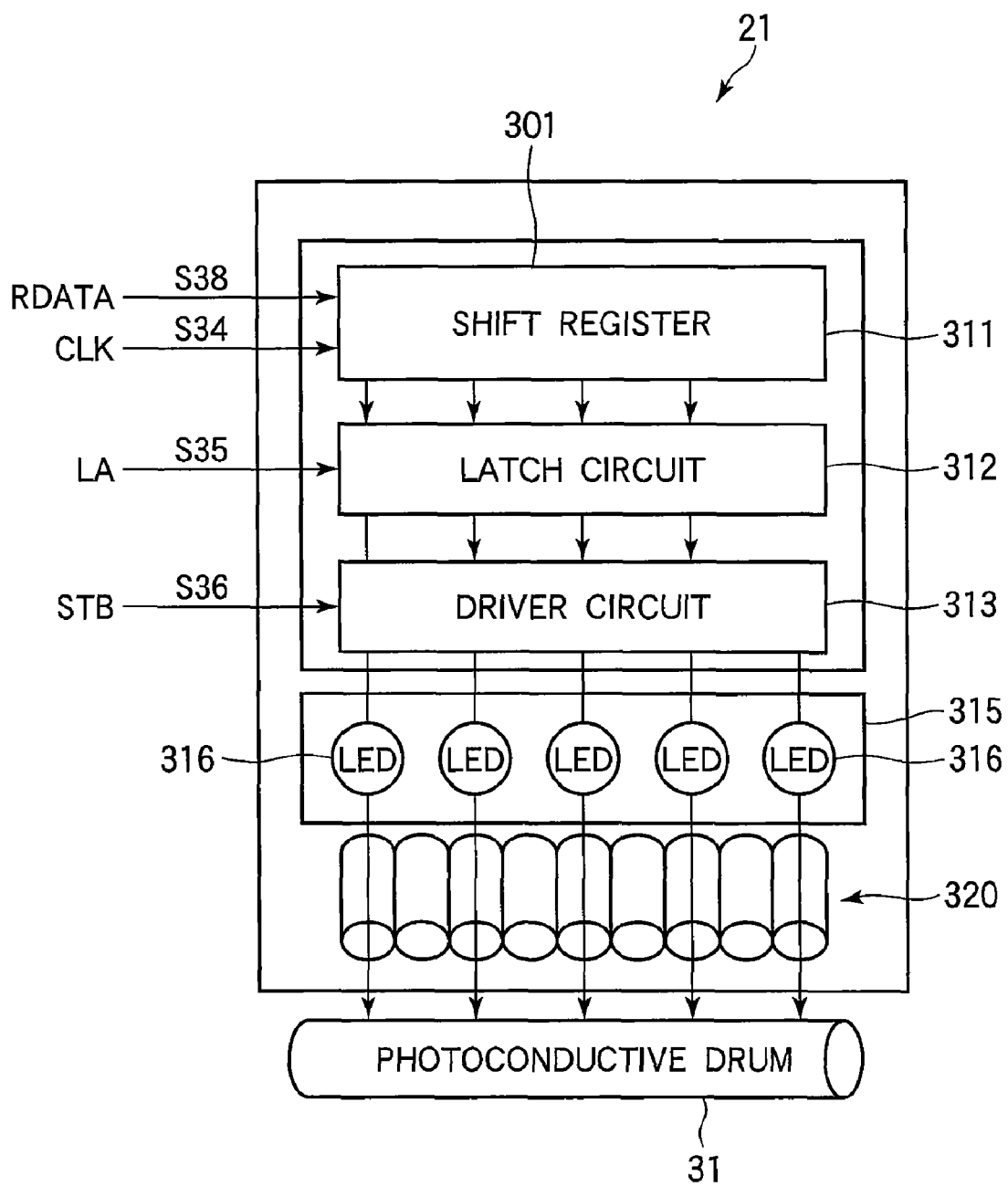
FIG. 3 is a block diagram illustrating the detail of an LED head.

FIG. 3 is a block diagram illustrating the detail of the LED head 21.

Referring to FIG. 3, the LED head 21 includes a driver chip 301, an LED array 315 that includes a plurality of LEDs 316, and a rod lens 320 that focuses light emitted from the respective LEDs on the surface of the photoconductive drum 31. The driver chip 301 includes a shift register 311, a latch circuit 312, and a driver circuit 313 that includes a plurality of NAND gates (not shown). The LED array 315 includes the same number of LEDs 316 as the pixels W aligned in the transverse direction.

The LED head 21 receives the read data RDATA (S38) from the image controller 51, the head clock CLK (S34), the latch signal LA (S35), and the strobe signal STB (S36).

After receiving the read data RDATA. (S38) for one sub line serially on the head clock CLK (S34) from the image controller 51, the shift register 311 outputs the read data RDATA as parallel data to the latch circuit 312. The latch circuit 312 receives the read data RDATA as parallel data from the shift register 311 upon the latch signal, and then outputs the parallel data to the driver circuit 313.

During a logic level "0" of the strobe signal STB, the NAND gates of the driver circuit 313 outputs a logic level "1" if the bits of the parallel data received from the latch circuit 312 are of a logic level "1", thereby causing current to flow through corresponding LEDs so that the LEDs emit light.

{Operation of Image Forming Apparatus}

The operation of the image forming apparatus 10 of the aforementioned configuration will be described with reference to FIG. 1. The image forming sections 11-14 are of substantially the same configuration, for simplicity, only the operation of the image forming section 11 for black will be described, it being understood that the other image forming sections work in a similar fashion.

When the image controller 51 receives the image data from the host apparatus, the photoconductive drum 31 begins to rotate. A charging means (not shown) charges the surface of the photoconductive drum 31 uniformly. Then, the LED head 21 illuminates the charged surface of the photoconductive drum 31 to form an electrostatic latent image. Then, a developing means (not shown) develops the electrostatic latent image with black toner into a visible image, a toner image.

The paper 17 is transported in a direction shown by arrow and passes through the transfer point defined between the photoconductive drum 31 and the transfer roller 42, such that the transfer roller 41 transfers the black toner image onto the paper 17. Likewise, the image forming sections 12-14 form yellow, magenta, and cyan toner images, which in turn are transferred onto the paper 17 one over the other in registration to form a full color toner image. As the paper 17 passes through the fixing point defined between the heat rollers 61 and 62, the full color toner image on the paper 17 is fused into a permanent full color image.

The operation of the image controller 51 that outputs the image data to the LED head 21 will be described by way of example of the image forming section 11.

{Receiving Image Data}

The image controller 51 receives the 8-bit image data rendered at 256 halftone levels from the host apparatus, and stores the image data for the printable area (FIG. 4) of one page of paper 17 into the halftone image memory 251 of image processing section 101.

{Writing Bi-Level Image}

The 8-bit image data rendered at 256 halftone levels in the halftone image memory 251 is read sequentially, i.e., from the left end sub dot to the right end sub dot on a sub line in FIG. 4. The dither screen filter 252 converts the image data rendered at 256 halftone levels into image data rendered at 7 halftone levels. The digitizing section 215 converts the image data rendered 7 halftone levels, received from the data processing section 101, into digital form. The digitized image data is stored into the bi-level image memory 103 in sequence. In this manner, the image data received from the host apparatus is converted into digitized data for one page of the paper 17.

Figure 7:
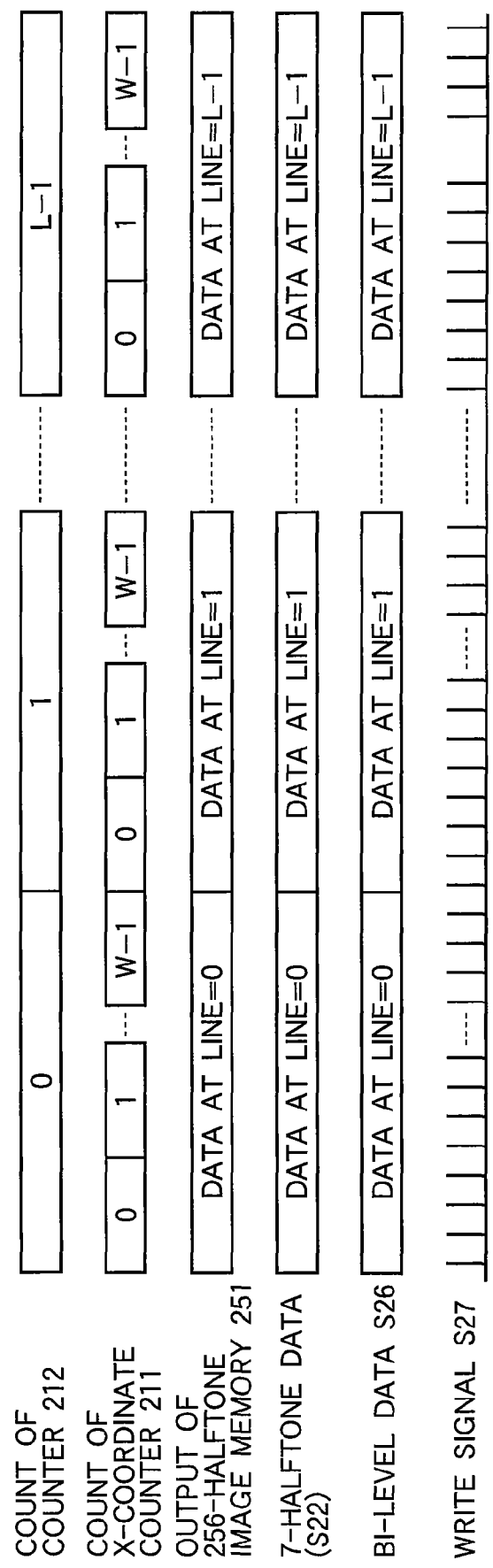
FIG. 7 is a timing chart illustrating the process of digitizing the image data.

FIG. 7 is a timing chart illustrating the process of digitizing the image data. The operation of digitizing the image data will be described in more detail with reference to the timing chart.

For each line counted by the line counter 212, from line #0 toward line #L−1, the counts of the X-coordinate counter 211 are used to address the halftone image memory 251, thereby reading the image data that describes pixels rendered at 256 halftone levels. The image data rendered at 256 halftone levels is then converted into the image data rendered at 7 halftone levels (S22) by the dither screen filter 252. Then, the image data rendered at 7 halftone levels (S22) is further converted into bi-level data (S26) by the digitizing section, and is stored into the bi-level image memory 103.

Figure 8:
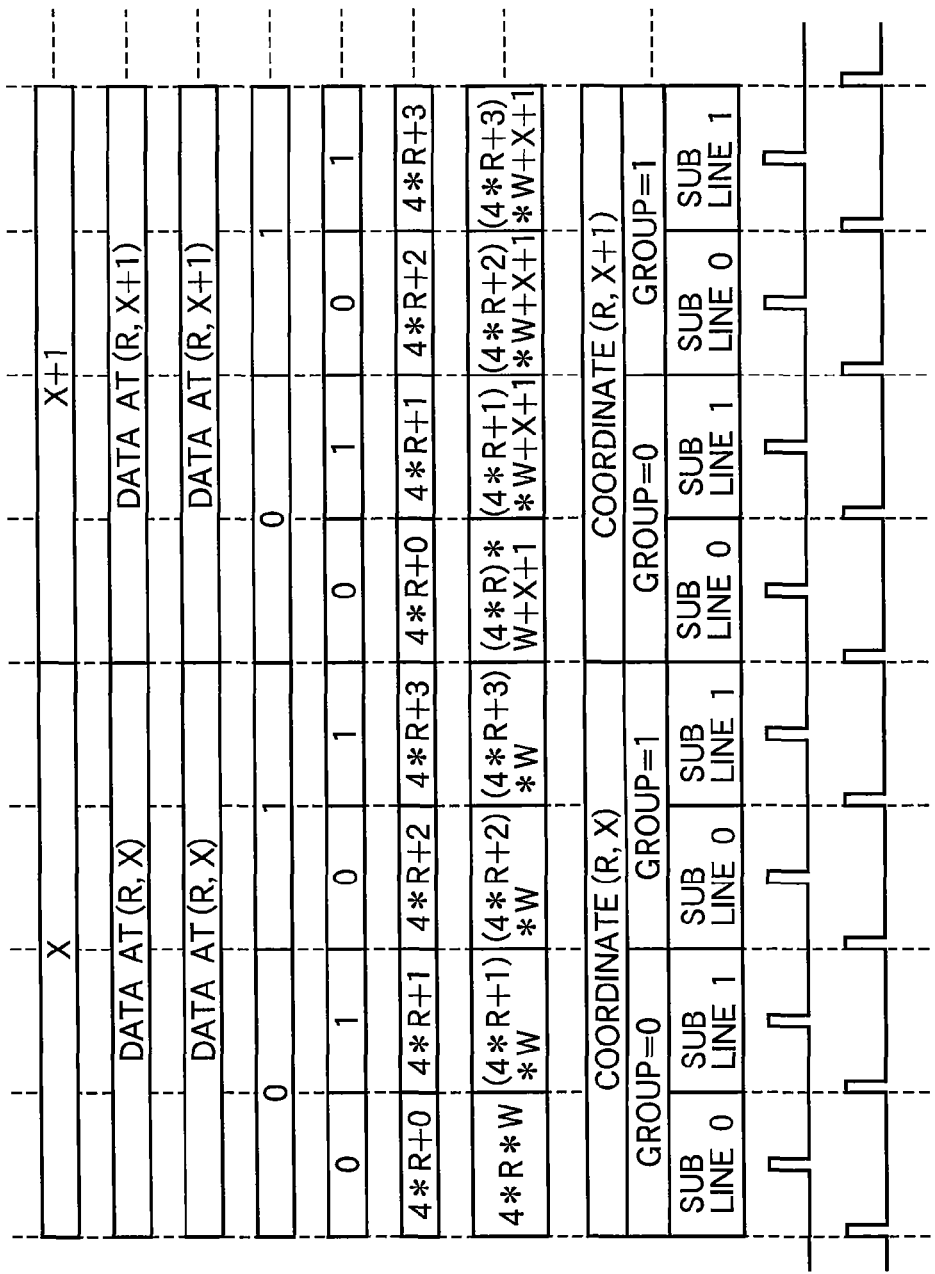
FIG. 8 is a timing chart illustrating the digitizing process in which the image data in each line is digitized on a pixel-by-pixel basis.

FIG. 8 is a timing chart illustrating the digitizing process in which the image data in each line is digitized on a pixel-by-pixel basis. FIG. 8 illustrates, by way of example, a pixel at an X-coordinate "X" and a pixel at an X-coordinate "X+1".

Referring to FIG. 8, data for a pixel specified by a line number R (count of the line counter 212) and the coordinate "X" on the X-axis is read from the halftone image memory 251, and is then converted by the dither screen filter 252 into the image data rendered at 7 halftone levels (S22). During the conversion, the sub line counter 214 repeats to count up from 0 to 1 upon a count signal (not shown) received from the timing controller 105. The group counter 213 counts up from 0 to 1 upon a carry outputted from the sub line counter 214.

The digitizing section 215 converts the image data (S22) rendered at 7 halftone levels into the write data WDATA (S26) according to the truth table in FIG. 9, and outputs the write data WDATA (S26) to the bi-level image memory 103 in sequence. Concurrently, the write signal generator 218 outputs the write signal to the bi-level image memory 103, so that the bi-level image data is written into the bi-level image memory 103.

Assume that a halftone level of "3" of the image data having 7 halftone levels is written into the bi-level image memory 103 according to the truth table in FIG. 9. When the group counter is "0" and the sub line counter is "0", a logic level "1" is written. When the group counter is "0" and the sub line counter is "1", a logic level "1" is written. When the group counter is "1" and the sub line counter is "0", a logic level "0" is written. When the group counter is "1" and the sub line counter is "1", a logic level "0" is written.

{Printing Image Data}

After writing the bi-level image data into the bi-level image memory 103, the data outputting section 104 reads the bi-level image data from the bi-level image memory 103, and provides the bi-level image data to the LED head 21. The bi-level image memory 103 is addressed, from line #0 to line #L−1, by the count of the line counter 232, so that the bi-level image data is read in sequence.

Figure 10:
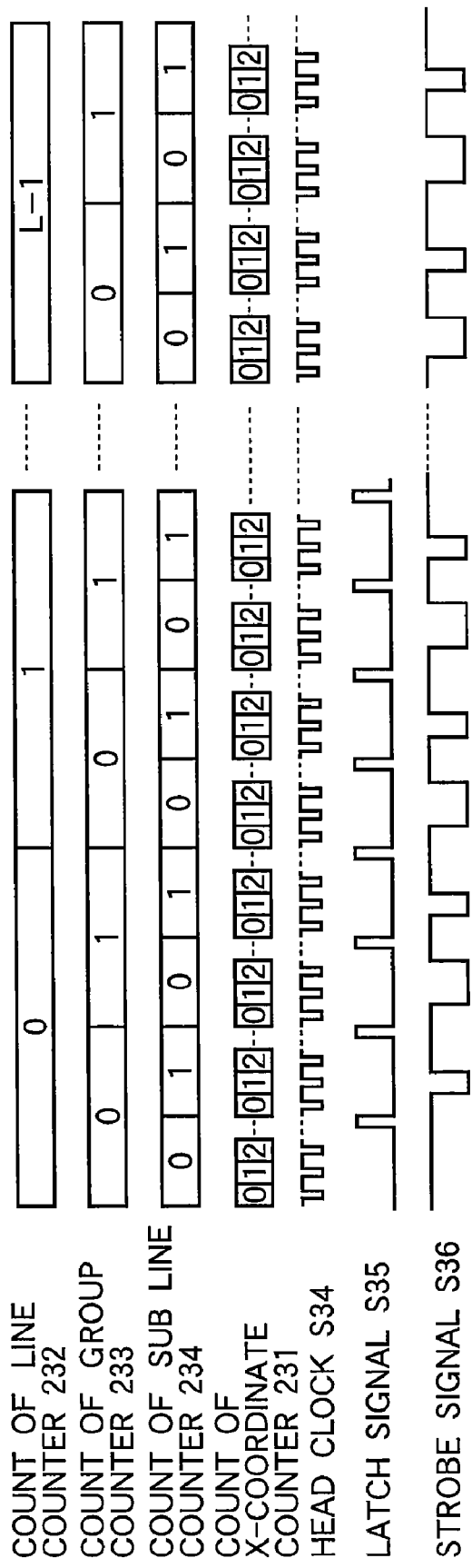
FIG. 10 is a timing chart illustrating a printing operation of the image data.

FIG. 10 is a timing chart illustrating a printing operation of the image data.

Each line of pixels is read from the bi-level image memory 103 in the order of sub line #0 to #1 of group #0, and then sub lines #0 to #1 of group #1. The image data for each sub dot in each sub line is read from the bi-level image memory 103 at a read address RADR computed based on the count of the X-coordinate counter 231 and the corrected Y-coordinate using Eq. (3), being outputted as the read data RDATA (S38) to the LED head 21.

It is to be noted that a Y-coordinate that has been corrected by the deviation d(Cx)×S addresses the bi-level image memory 103 to read the read data RDATA and write it into the shift register 311 (FIG. 3) in the LED head 21. Therefore, the positional errors due to mounting errors or distortion or deformation of the LED head 21 may be corrected.

The head controller 239 outputs the head clock CLK (S34) concurrently with reading of the bi-level image data from the bi-level image memory 103, so that the read data RDATA and the head clock CLK (S34) are inputted to the shift register 311 (FIG. 3) in the LED head 21. Upon completion of the reading of bi-level image data for one sub line from the bi-level image memory 103, the head controller 239 provides the latch signal LA (S35) to the LED head 21. The read data RDATA received in the shift register 311 is copied into the latch circuit 312 on the latch signal LA. In other words, at this moment, the respective latching elements in the latch circuit 312 copy a logic level "1" or a logic level "0" for driving corresponding LEDs 316.

After the head controller 239 outputs the latch signal LA, the timing controller 105 provides the triggering signal to the strobe signal generator 237, which in turn outputs a strobe signal STB (S36) to the LED head 21. The strobe signal STB (S36) has a strobe time T that varies depending on the sub lines. In the first embodiment, the strobe time T for sub line #1 is twice as long as that for sub line #0. The latch circuit 312 outputs the parallel data to the gates of the driver circuit 313. The gates of the driver circuit 313 output a logic level "1" only when the latch circuit 312 outputs a logic level "1" to the driver circuit 313, so that the output of a gate of a logic level "1" causes a corresponding LED to emit light during a logic level "0" of the strobe signal STB.

For example, dots having the same exposure energy are formed during a logic level "0" of the strobe signal STB in accordance with bi-level image data read from the bi-level image memory 103, the dots being specified by the line #0, group #0, sub line #0, and "0" to "W−1" (i.e., an X-coordinate).

Then, dots having the same exposure energy are formed in accordance with bi-level image data, the dots being specified by the line #0, group #0, sub line #1, and "0" to "W−1" (i.e., an X-coordinate) during a logic level "0" of the strobe signal STB.

Likewise, dots having the same exposure energy are formed in accordance with bi-level image data until a dot specified by the line #L−1, group #1, sub line #2, and "0" to "W−1" of X-coordinate) is formed.

FIG. 11 illustrates the patterns of sub dots rendered at 7 different halftone levels.

The duration of the strobe time T for sub line #0 is such that dots in sub line #0 are small. The duration of the strobe time T for sub line #1 is such that dots in sub line #1 are large.

For example, when a halftone level of "3" of the image data rendered at 7 halftone levels is printed at line #R and at an X-coordinate "0," the bi-level data is printed as shown in FIG. 11. In other words, when the group is #0 and the sub line is #0, a logic level "1" having a small dot is printed during the strobe time T. When the group is #0 and the sub line is #1, a logic level "1" having a large dot is printed. When the group is #1 and the sub line is #0, no dot is printed. When the group is #1 and the sub line is #1, no dot is printed.

As described above, pixels rendered at 7 halftone levels are formed by combining two groups each of which includes a large sub dot and/or a small sub dot. The halftone level M meets the following relation.

$$M \leq (2^S - 1) \times G + 1$$

FIG. 12B illustrates print results of 3-bit image data rendered at 7 halftone levels when the bi-level image data is outputted according to the timing chart in FIG. 10. FIG. 12A illustrates a comparative example in which no correction was made. In FIGS. 12A and 12B, dot-dash lines indicate a line of pixels when the LED head is properly mounted.

Referring to FIG. 12B, the bi-level image data is read from the bi-level image memory 103 while also correcting the position of sub dots on the Y-axis by an amount of d(Cx)×S such that the sub dots are moved by a minimum distance. Because the correction is made in increments of a group, the correction is such that the respective sub dots are moved in increments of the spacing H between adjacent groups.

Figure 13A:
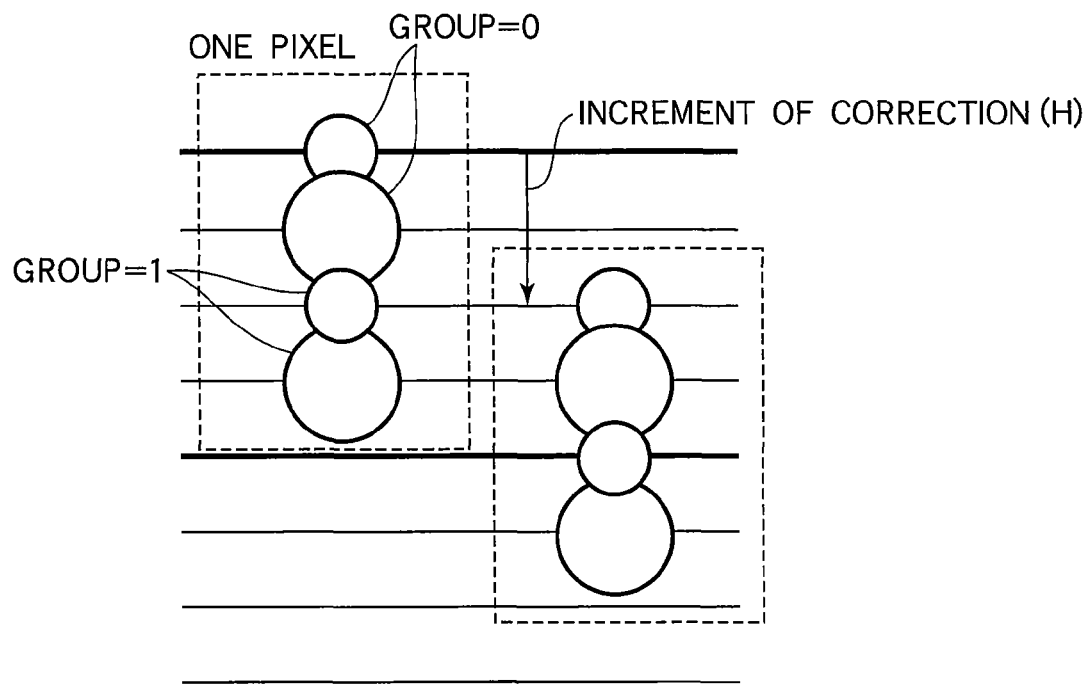
FIG. 13A illustrates the correction made in the first embodiment such that the positions of sub dots are moved by a minimum distance.
Figure 13B:
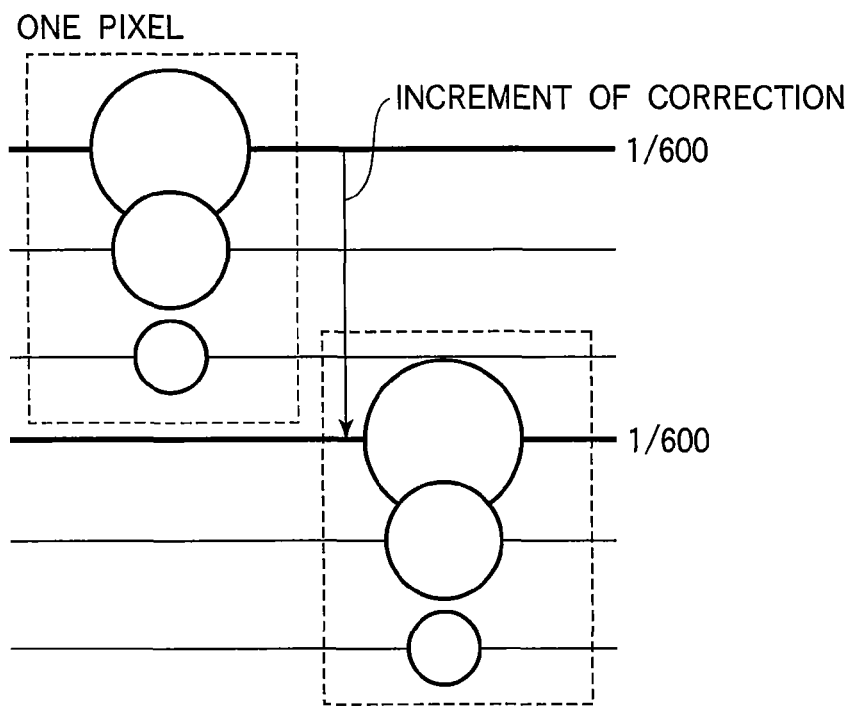
FIG. 13B illustrates the correction made using a conventional method such that the positions of sub dots are moved by a minimum distance.

FIGS. 13A and 13B illustrate advantages of correcting the position of sub dots in the manner described in the first embodiment. FIG. 13A illustrates the correction made according to the first embodiment such that the positions of sub dots are moved by a minimum distance. FIG. 13B illustrates the correction made using a conventional method such that the positions of sub dots are moved by a minimum distance.

It is to be noted that when the position of sub dots is corrected, the sub dots are moved while maintaining the relative position of the sub dots.

In the first embodiment, each pixel is formed of two groups of sub dots, each group including a large dot and/or a small sub dot. This configuration allows the sub dots to be moved in increments of the spacing H between the adjacent groups. In contrast, the pixel of the comparative example (FIG. 13B) is formed of three sub dots having three different sizes. Therefore, correction can only be made by moving the sub sots in increments of the spacing between the two adjacent lines.

Figure 13C:
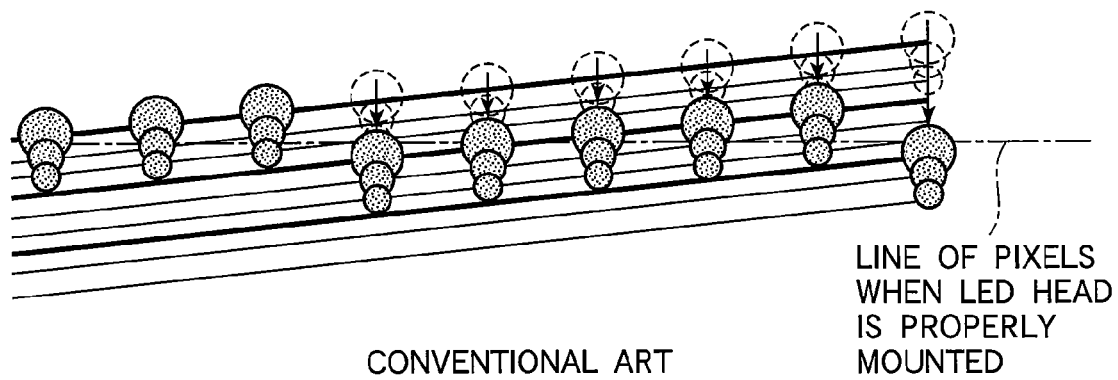
FIG. 13C illustrates a comparative example in which the spacing between adjacent sub lines in the advance direction is halved in an attempt to correct positional errors.

FIG. 13C illustrates a comparative example in which the spacing between adjacent sub lines in the advance direction is halved in an attempt to correct positional errors. Having the spacing between adjacent lines may improve the accuracy of correction by a factor of two. However, halving the spacing between adjacent sub lines, the halftone image memory is required to have twice as large a capacity as before. Further, an increase in the spacing between adjacent sub lines will lead to a decrease of printing speed by 50%.

As described above, decreasing the spacing between adjacent sub lines provides positional correction of sub dots with substantially the same accuracy as the comparative example in FIG. 13C, while still maintaining the same capacity of the halftone image memory. It is only necessary to sacrifice the printing speed by 33% and increase the capacity of the bi-level image memory 103 by 33%.

The image forming apparatus of the first embodiment provides positional correction of sub dots by moving the sub dots in increments of the spacing between adjacent lines, while minimizing demerits such as deterioration of printing speed and an increase of memory capacity. This permits minimizing of color shift in multi-color printing.

Second Embodiment

Figure 14:
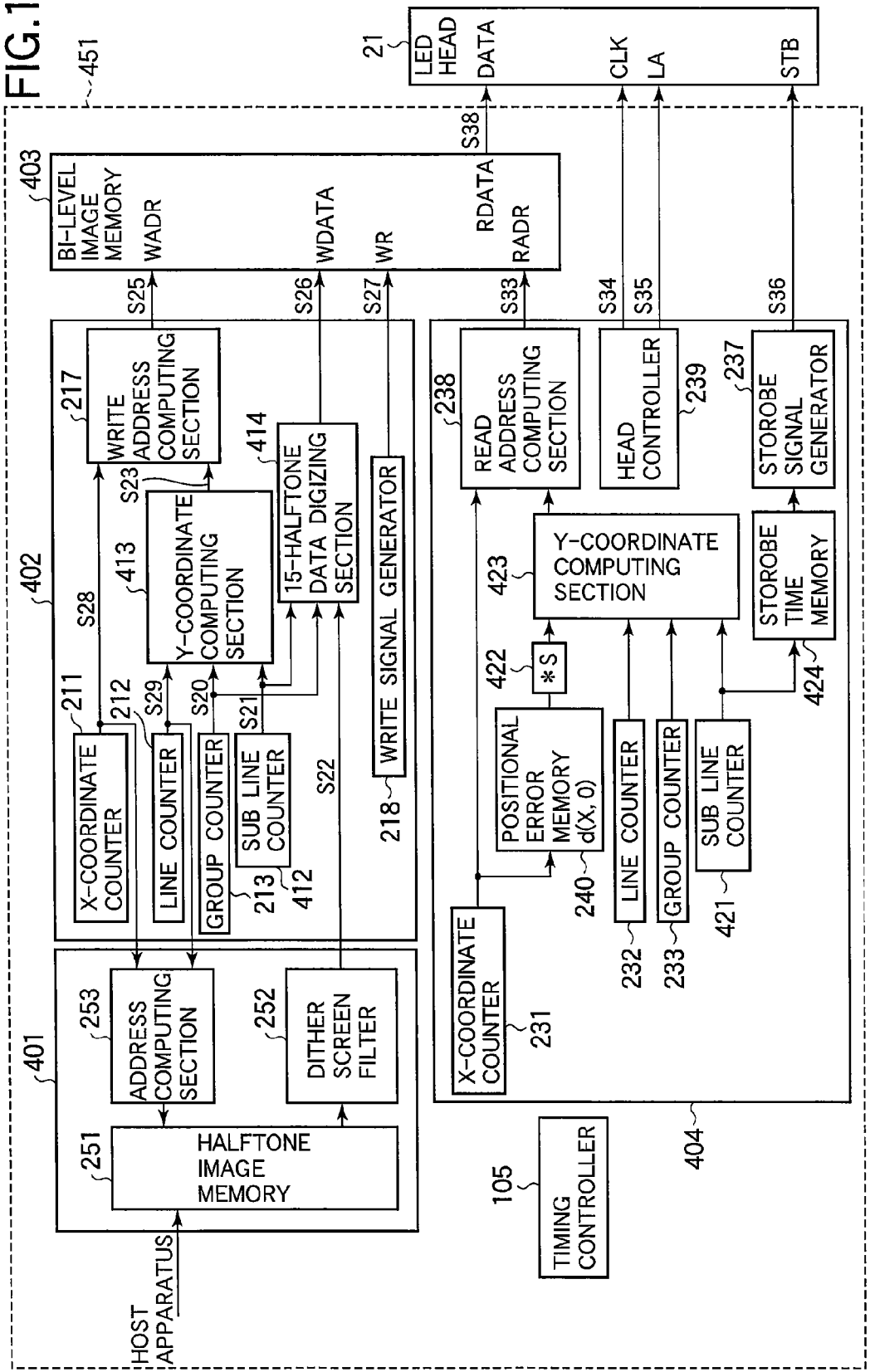
FIG. 14 is a block diagram illustrating the sections in a controller of a second embodiment.

FIG. 14 is a block diagram illustrating the sections in a controller 451 of a second embodiment. The controller 451 differs from the controller 51 in the following points:

(1) A dither screen filter 411 of a data processing section 401 receives image data rendered at 256 halftone levels and outputs image data (S22) rendered at 15 halftone levels.

(2) A data decoder 414 of receives image data rendered at 15 halftone levels (S22). FIG. 17 illustrates a truth table for the data decoder 414.

(3) The number of sub lines in a group is 3, and therefore a sub line counter 412 counts from "0" to "2."

(4) A Y-coordinate computing section 413 computes a Y-coordinate putting S=3 into Eq. (1). A Y-coordinate computing section 423 computes a correction to the Y-coordinate putting S=3 into Eq. (2).

(5) Because the number of sub lines is 3, a bi-level image memory 403 requires a 50% larger capacity than a bi-level image memory 103 of the first embodiment.

(6) When a data outputting section 404 computes a deviation of position of pixels, the output of a positional error memory 240 is multiplied by 3 in a multiplier 422.

(7) The number of sub lines in a group is 3, and therefore a sub line counter 421 counts from "0" to "2."

(8) A strobe time memory 424 in the data outputting section 404 stores three different items of strobe time data.

Thus, for the controller 451, elements similar to those of the controller 51 (FIG. 2) of the first embodiment have been given the same reference numerals and their detailed description is omitted.

The controller 451 operates in the same way as the controller 51 except that the number of sub lines per group is 3 instead of 2, three different strobe times T are used, and halftone is expressed in 15 levels instead of 7 levels. The operation of the controller 451 will be described.
{Writing Bi-Level Image}

The 8-bit image data rendered at 256 halftone levels in the halftone image memory 251 is read sequentially, from the left end sub dot to the right end sub dot on a sub line in FIG. 4. The dither screen filter 411 converts the image data rendered at 256 halftone levels into image data rendered at 15 halftone levels. The digitizing section 414 converts the image data rendered at 15 halftone levels, received from the data processing section 101, into digital form. The digitized image data is stored into the bi-level image memory 403 in sequence. In this manner, the image data received from the host apparatus is converted into digitized data for one page of the paper 17.

Figure 15:
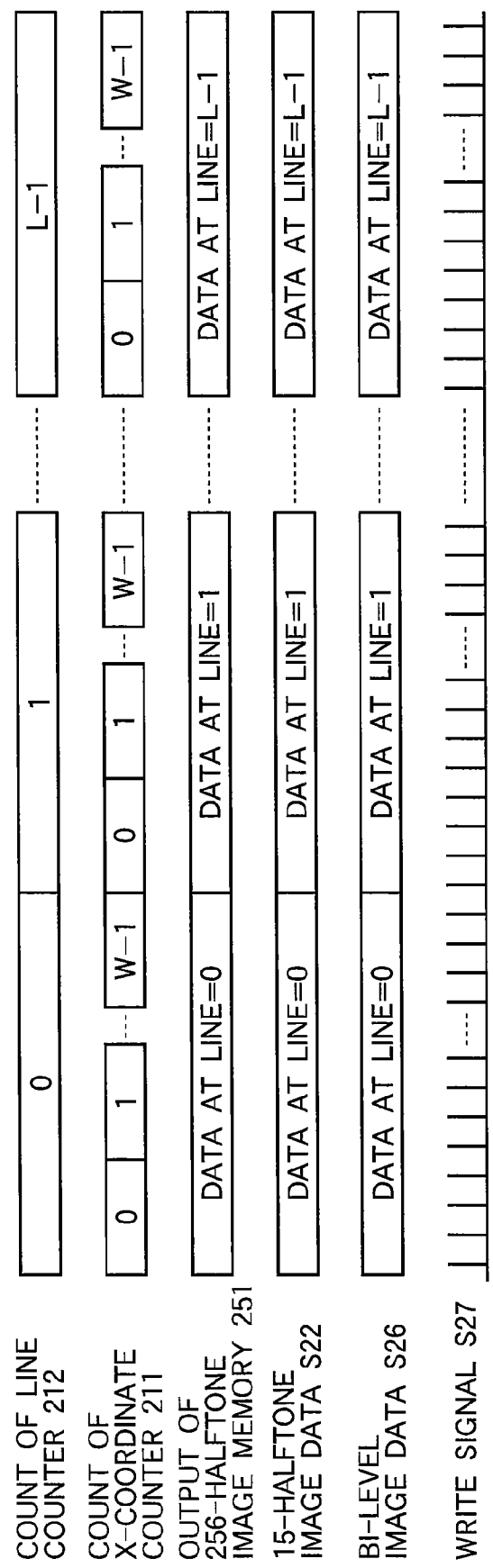
FIG. 15 is a timing chart illustrating the process of digitizing the image data.

FIG. 15 is a timing chart illustrating the process of digitizing the image data. The operation of digitizing the image data will be described in more detail with reference to the timing chart.

For each line counted by the line counter 212, from line #0 toward line #L−1, the counts of the X-coordinate counter 211 are used to address the halftone image memory 251 to read the image data that describes pixels rendered at 256 halftone levels. The image data rendered at 256 halftone levels is then converted into the image data rendered at 15 halftone levels (S22) by the dither screen filter 411. The image data rendered at 15 halftone levels (S22) is further converted into bi-level data (S26) by the digitizing section 414, and is stored into the bi-level image memory 403.

Figure 16:
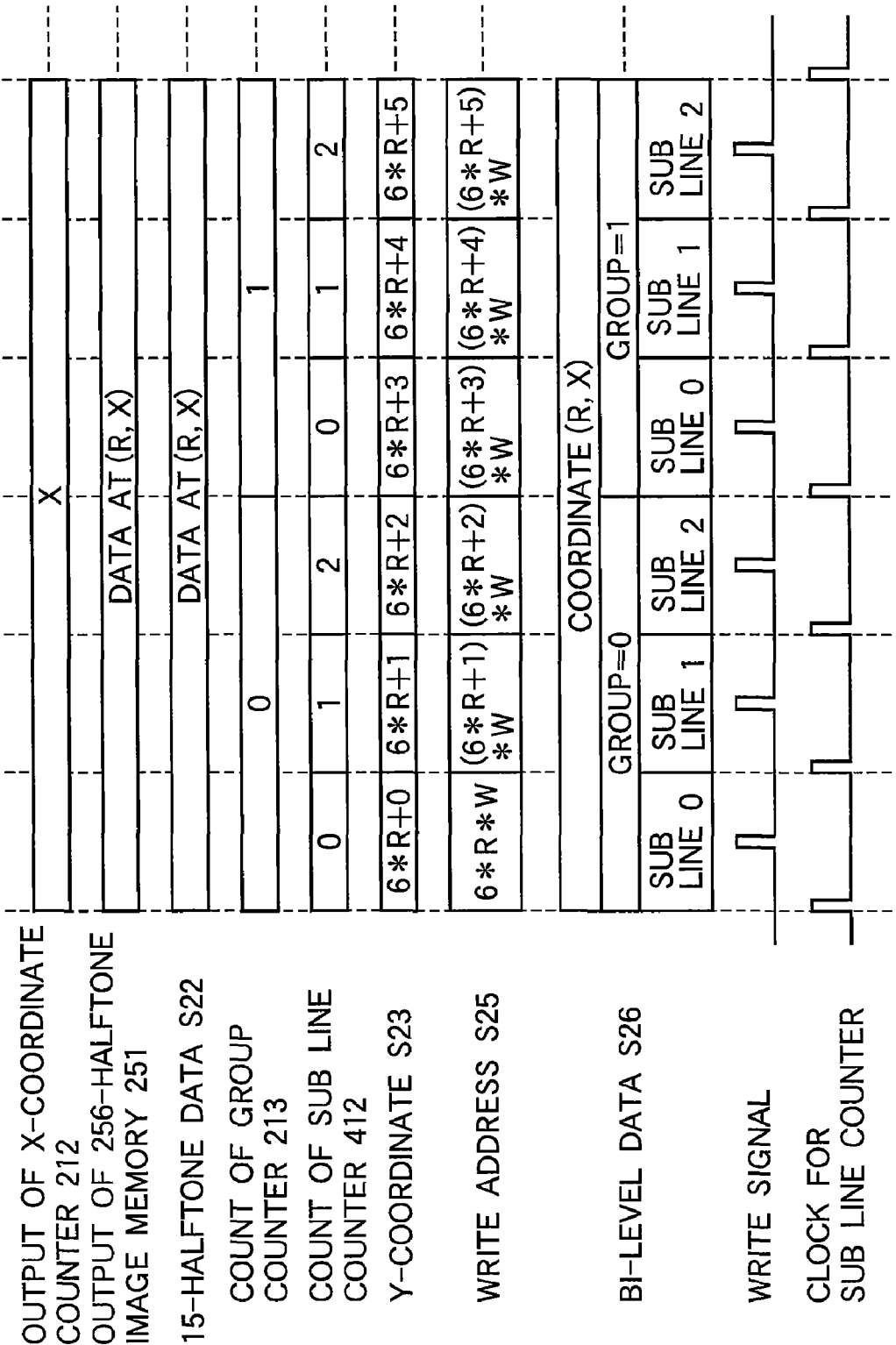
FIG. 16 is a timing chart illustrating the digitizing process in which the image data in each line is digitized on a pixel-to-pixel basis.

FIG. 16 is a timing chart illustrating the digitizing process in which the image data in each line is digitized on a pixel-to-pixel basis. FIG. 16 illustrates, by way of example, a pixel at an X-coordinate "X."

Referring to FIG. 16, data for a pixel specified by a line number R (count of the line counter 212) and a coordinate "X" in the X-axis is read from the halftone image memory 251, and is then converted by the dither screen filter 411 into the image data rendered at 15 halftone levels (S22). During the conversion, the sub line counter 412 repeats counting from 0 to 1 upon a count signal (not shown) received from the timing controller 105. The group counter 213 counts from 0 to 1 upon a carry outputted from the sub line counter 412.

The digitizing section 414 converts the image data (S22) rendered at 15 halftone levels into the write data WDATA (S26) according to the truth table in FIG. 17, and outputs the write data WDATA (S26) to the bi-level image memory 403 in sequence. Concurrently, the write signal generator 218 outputs the write signal to the bi-level image memory 403, so that the bi-level image data is written into the bi-level image memory 403.

Assume that a halftone level of "7" of the image data rendered at 15 halftone levels is written into the bi-level image memory 403 at a line #R and at a coordinate of "X" on the X-axis (i.e., traverse direction), the bi-level data being written according to the truth table in FIG. 17.

When the group is #0 and the sub line is #0, a logic level "1" is written.

When the group is #0 and the sub line is #1, a logic level "1" is written.

When the group is #0 and the sub line is #2, a logic level "1" is written.

When the group is #1 and the sub line is #0, a logic level "0" is written.

When the group is #1 and the sub line is #1, a logic level "0" is written.

When the group is #1 and the sub line is #2, a logic level "0" is written.
{Printing Image Data}

After writing the bi-level image data into the bi-level image memory 403, the data outputting section 104 reads the bi-level image data from the bi-level image memory 403, and provides the bi-level image data to the LED head 21. The counts of the line counter 232 are used to address the bi-level image memory 403, from line #0 to line #L−1, so that the bi-level image data is read in sequence.

Figure 18:
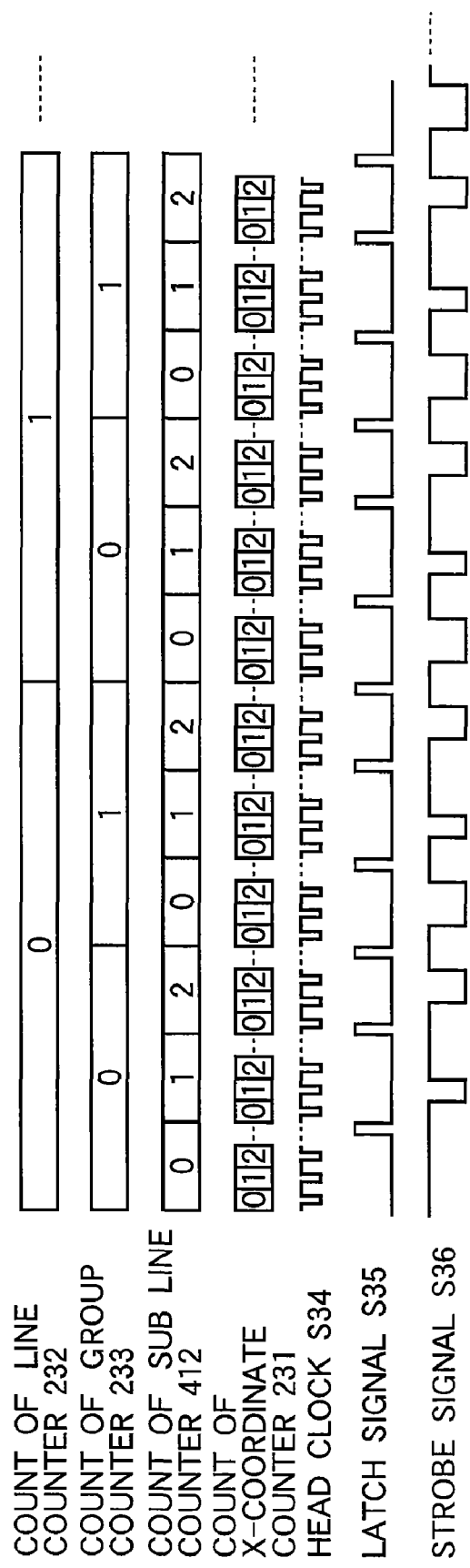
FIG. 18 is a timing chart illustrating a printing operation of the image data.

FIG. 18 is a timing chart illustrating a printing operation of the image data.

Each line of pixels is read from the bi-level image memory 103 in the order of sub lines #0, #1, and #2 of group #0, and then sub lines #0 to #1 of group #1. The image data for each of sub dots in each sub line is read from the bi-level image memory 403 by using a read address RADR computed based on the count of the X-coordinate counter 231 and the corrected Y-coordinate using Eq. (3), being outputted as the read data RDATA (S38) to the LED head 21.

It is to be noted that a Y-coordinate that has been corrected by the deviation $d(Cx) \times S$ addresses the bi-level image memory 103 to read the read data RDATA into the shift register 311 (FIG. 3) in the LED head 21. In this manner, the positional errors due to mounting error or distortion or deformation of the LED head 21 may be corrected. It is to be noted that the value of S in Eq. (2) is "3" and the value of G is "2."

The LED head 21 receives the read data RDATA, and emits light in the same way as in the first embodiment, and therefore the detailed description of the operation of the LED head 21 is omitted. The three different strobe times T for sub lines #0, #1, and #2 are related in duration such that strobe time T(0):strobe time T(1):strobe time T(2)=1:2:4

Referring to FIG. 18, dots having the same exposure energy are formed during a logic level "0" of the strobe signal STB in accordance with bi-level image data read from the bi-level image memory 103, the positions of dots being specified by the line #0, group #0, sub line #0, and "0" to "W−1" (an X-coordinate).

Then, dots having the same exposure energy are formed during a logic level "0" of the strobe signal STB in accordance with bi-level image data, the dots being specified by the line #0, group #0, sub line #1, and "0" to "W−1" (an X-coordinate).

Then, dots having the same exposure energy are formed during a logic level "0" of the strobe signal STB in accordance with bi-level image data, the dots being specified by the line #0 (count of the line counter 232), group #0, sub line #2, and "0" to "W−1" (an X-coordinate).

Likewise, dots having the same exposure energy are formed during a logic level "0" of the strobe signal STB in accordance with bi-level image data until a dot specified by the line #L−1, group #1, sub line #2, and "0" to "W−1" of X-coordinate) is formed.

FIG. 19 illustrates the patterns of sub dots rendered at 15 different halftone levels.

The duration of the strobe time T for sub line #0 is such that dots in sub line #0 are small. The duration of the strobe time T for sub line #1 is such that dots in sub line #1 are medium. The duration of the strobe time T for sub line #2 is such that dots on the sub line #2 are large.

Assume that a halftone level of "7" of the image data rendered at 15 halftone levels is printed at a line #R and at an X-coordinate "0." The bi-level data is printed as shown in FIG. 19. In other words, when the group is #0, the sub line is #0, a logic level "1" having a small dot is printed during the strobe time T.

When the group is #0 and the sub line is #1, a logic level "1" having a medium dot is printed.

When the group is #0 and the sub line is #2, a logic level "1" having a large dot is printed.

When the group is #1 and the sub line is #0, no dot is printed.

When the group is #1 and the sub line is #1, no dot is printed.

When the group is #1 and the sub line is #2, no dot is printed.

As described above, pixels rendered at 15 halftone levels are formed by combining two groups each of which includes a large sub dot, a medium sub dot, and/or a small sub dot.

Figure 20A:
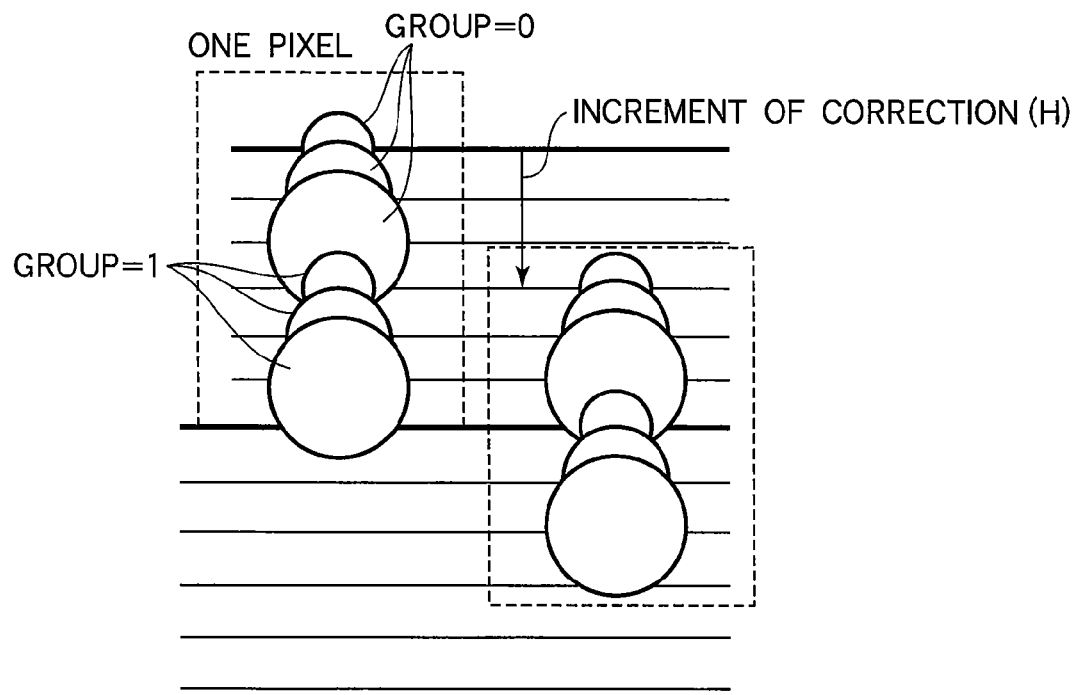
FIG. 20A illustrates correction performed in the second embodiment such that the positions of sub dots are moved by a minimum distance.
Figure 20B:
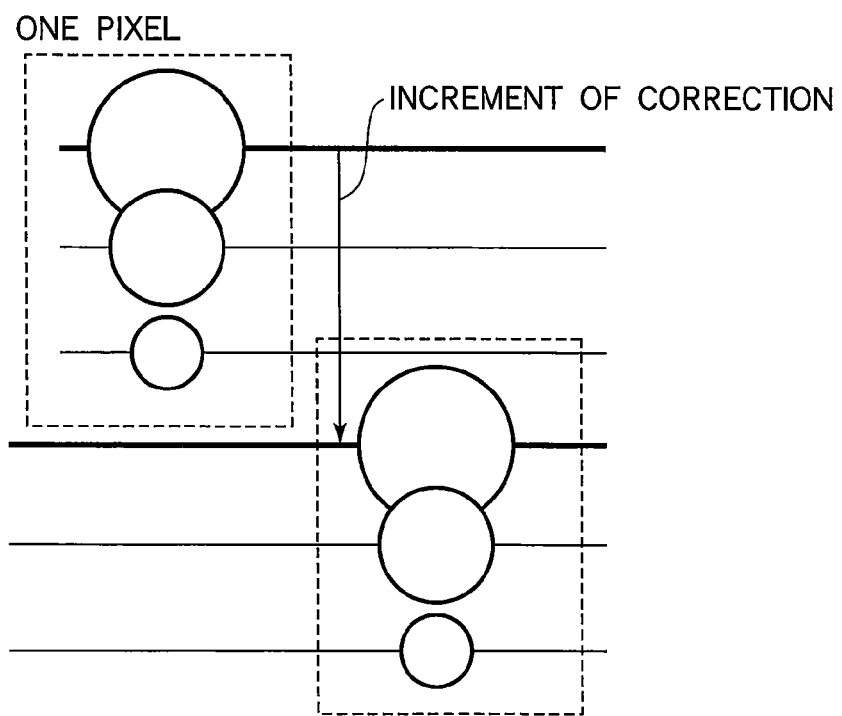
FIG. 20B illustrates the correction performed by using a conventional method such that the positions of sub dots are moved by a minimum distance.

FIG. 20A illustrates correction performed in the second embodiment such that the positions of sub dots are moved by a minimum distance. FIG. 20B illustrates the correction performed by using a conventional method such that the positions of sub dots are moved by a minimum distance.

Referring to FIG. 20A, the bi-level image data is read from the bi-level image memory 403 while also correcting the position of sub dots in the Y-coordinate by a correction d(Cx)×S such that the sub dots are moved by a minimum distance in the second embodiment. Because the correction is made in increments of a group, the correction is such that the respective sub dots are moved in increments of the spacing H between adjacent groups.

It is to be noted that when the positions of sub dots are corrected, the sub dots are moved while maintaining the relative position of the sub dots.

In the second embodiment, each pixel is formed of two groups of sub dots. Each of the two groups may include three different sizes of sub dots: a large sub dot, a medium sub dot, and a small sub dot. This configuration allows the sub dots to be moved in increments of the spacing H between the adjacent groups. In contrast, the pixel of the comparative example (FIG. 20B) is formed of three sub dots having three different sizes. Therefore, correction can only be made by moving the sub dots in increments of the spacing between the two adjacent lines.

The image forming apparatus of the second embodiment provides correction of the positions of sub dots by moving the sub dots in increments of half the spacing between adjacent lines while minimizing demerits such as a decrease in printing speed and an increase of memory capacity. This permits minimizing of color shift in multi-color printing. In the second embodiment, three sub dots are used in a group and 15 halftone levels are employed. Thus, the number of dots per unit area is larger in the second embodiment than in the first embodiment.

Third Embodiment

Figure 21:
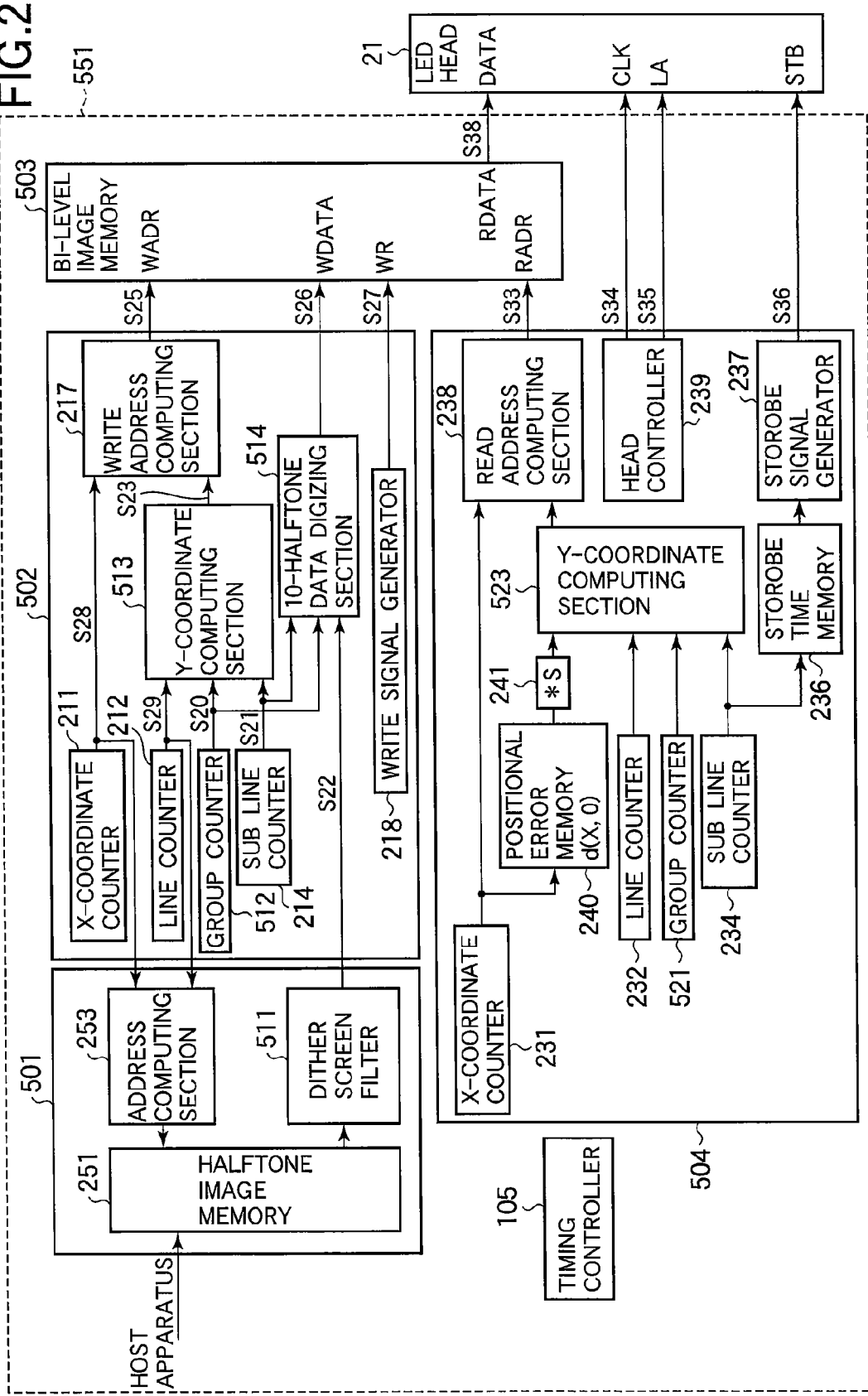
FIG. 21 is a block diagram illustrating the sections in a controller of a third embodiment.

FIG. 21 is a block diagram illustrating the sections in a controller 551 of a third embodiment. The controller 551 differs from the controller 51 (FIG. 2) in the following points:

(1) A dither screen filter 511 of a data processing section 501 receives image data rendered at 256 halftone levels, and outputs image data rendered at 10 halftone levels.

(2) A data decoder 514 receives image data rendered at 10 halftone levels (S22). FIG. 24 illustrates the truth table for the data decoder 514.

(3) The number of groups is 3, and therefore a group counter 512 counts from "0" to "2."

(4) Because the number of groups is 3, a group counter 521 of a data outputting section 504 counts from "0" to "2."

(5) A Y-coordinate computing section 513 computes a Y-coordinate putting G=3 into Eq. (1). A Y-coordinate computing section 523 computes a correction to the Y-coordinate putting G=3 into Eq. (2).

Thus, for the controller 551, elements similar to those of the controller 51 (FIG. 2) of the first embodiment have been given the same reference numerals and their detailed description is omitted.

The controller 551 operates in the same way as the first embodiment except that the number of sub lines per group is 3 instead of 2, and halftone is rendered at 15 levels instead of 7 levels. The operation of the controller 551 will be described.

{Writing Bi-Level Image}

The 8-bit image data rendered at 256 halftone levels is read from the halftone image memory 251 sequentially, from the left end sub dot to the right end sub dot on a sub line in FIG. 4. The dither screen filter 511 converts the image data rendered at 256 halftone levels into image data rendered at 10 halftone levels. The digitizing section 514 converts the image data rendered at 10 halftone levels, received from the data processing section 501, into digital form. The digitized image data is stored into the bi-level image memory 503 in sequence. In this manner, the image data received from a host apparatus is converted into digitized data for the printable area of one page of paper 17.

Figure 22:
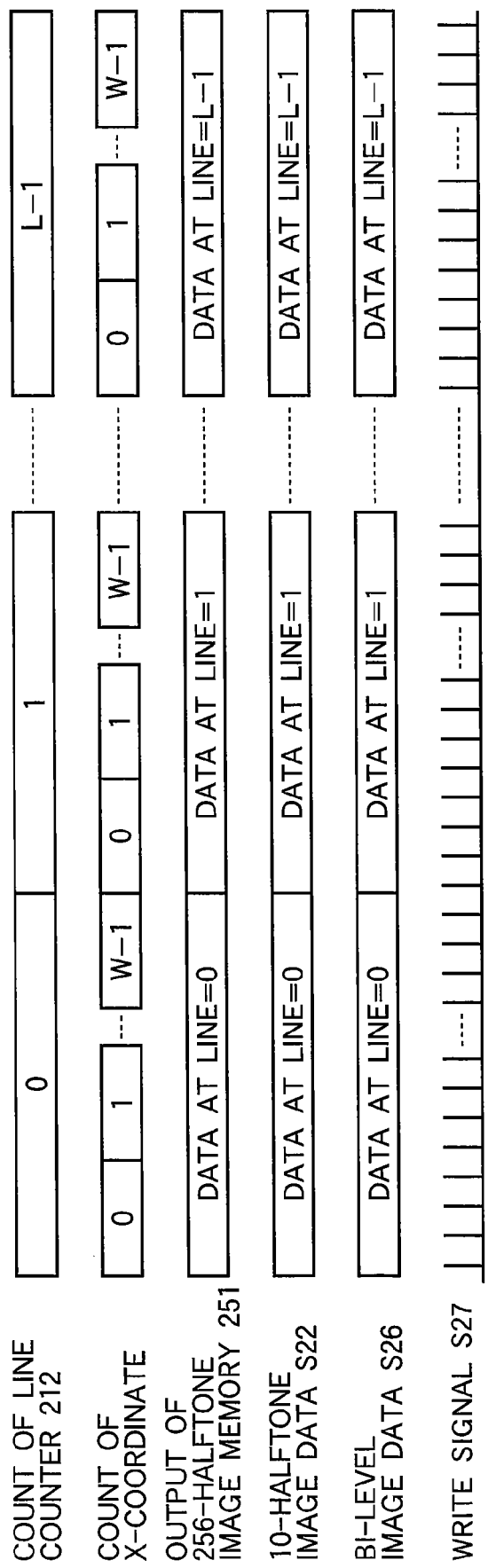
FIG. 22 is a timing chart illustrating the process of digitizing image data.

FIG. 22 is a timing chart illustrating the process of digitizing the image data. The operation of digitizing the image data will be described in more detail with reference to the timing chart.

For each line counted by the line counter 212, from line #0 toward line #L−1, the counts of the X-coordinate counter 211 are used to address the halftone image memory 251, thereby reading the image data that describes pixels rendered at 256 halftone levels. The image data rendered at 256 halftone levels is then converted into the image data rendered at 10 halftone levels (S22) by the dither screen filter 511. The image data rendered at 10 halftone levels (S22) is further converted into bi-level data (S26) by the digitizing section 514, and is stored into the bi-level image memory 503.

Figure 23:
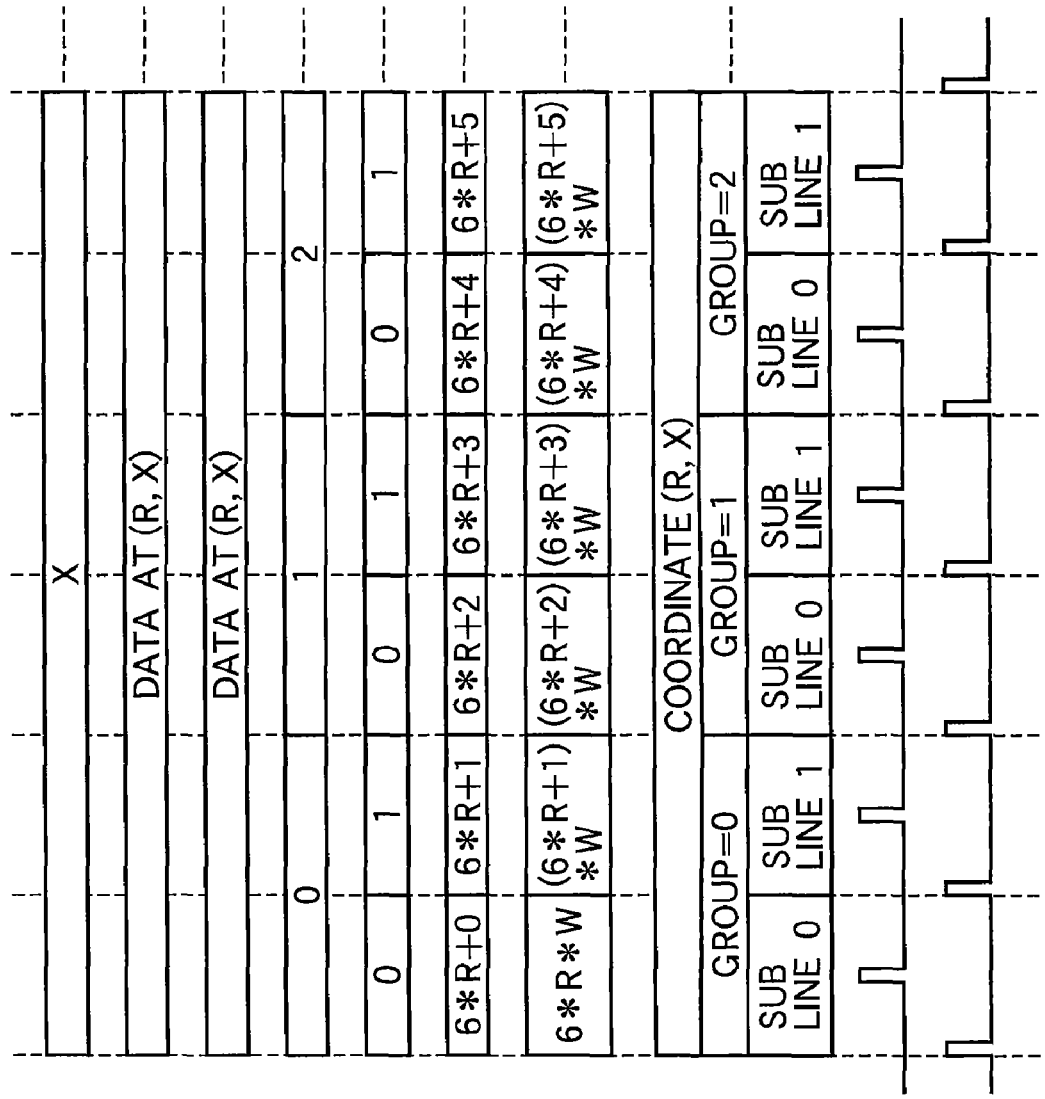
FIG. 23 is a timing chart illustrating the digitizing process in which the image data in each line is digitized on a pixel-by-pixel basis.

FIG. 23 is a timing chart illustrating the digitizing process in which the image data in each line is digitized on a pixel-by-pixel basis.

Referring to FIG. 23, data for a pixel specified by a line number R (count of the line counter 212) and a coordinate "X" on the X-axis is read from the halftone image memory 251, and is then converted by the dither screen filter 511 into the image data rendered at 10 halftone levels (S22). During the conversion, the sub line counter 214 repeats counting from 0 to 1 upon a count signal (not shown) received from the timing controller 105. The group counter 512 counts from 0 to 2 upon a carry outputted from the sub line counter 214.

The digitizing section 514 converts the image data (S22) rendered at 10 halftone levels into the write data WDATA (S26) according to the truth table in FIG. 24, and outputs the write data WDATA (S26) to the bi-level image memory 503 in sequence. Concurrently, the write signal generator 218 outputs the write signal to the bi-level image memory 503, so that the bi-level image data is written into the bi-level image memory 503.

For example, assume that a halftone level of "5" of the image data rendered at 10 halftone levels is written into the bi-level image memory 503 at a position at a line #R and a coordinate "0" on the X-axis, the bi-level data being written according to the truth table in FIG. 24.

In other words, when the group is #0 and the sub line is #0, a logic level "1" is written.

When the group is #0 and the sub line is #1, a logic level "1" is written.

When the group is #1 and the sub line is #0, a logic level "0" is written.

When the group is #1 and the sub line is #1, a logic level "1" is written.

When the group is #2 and the sub line is #0, a logic level "0" is written.

When the group is #2 and the sub line is #1, a logic level "0" is written.

{Printing Image Data}

After writing the bi-level image data into the bi-level image memory 503, the data outputting section 504 reads the bi-level image data from the bi-level image memory 503, and provides the bi-level image data to the LED head 21. The counts of the line counter 232 are used to address the bi-level image memory 503, from line #0 to line #L−1, so that the bi-level image data is read in sequence.

Figure 25:
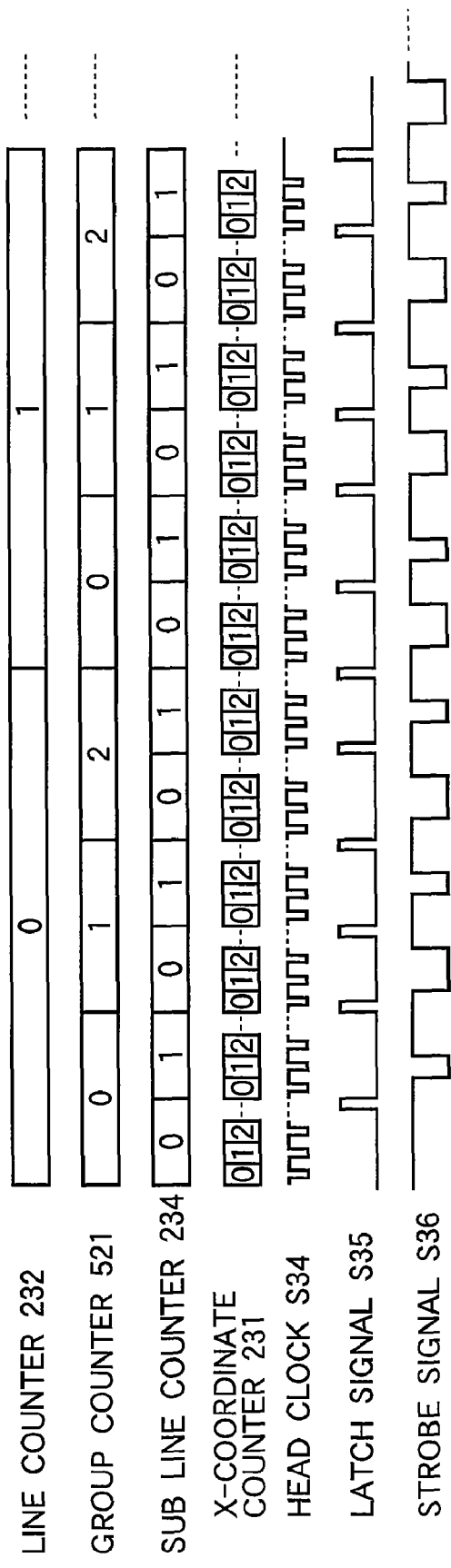
FIG. 25 is a timing chart illustrating a printing operation of the image data.

FIG. 25 is a timing chart illustrating a printing operation of the image data.

Each line of pixels is read from the bi-level image memory 503 in the order of sub lines "0" to "1" of group #0, then sub lines "0" to "1" of group #1, and finally sub lines # 0 to #1 of group #2. The image data for sub dots in each sub line is read from the bi-level image memory 503 at a read address RADR computed based on the count of the X-coordinate counter 231 and the corrected Y-coordinate using Eq. (3), being outputted as the read data RDATA (S38) to the LED head 21.

It is to be noted that an X-coordinate and a Y-coordinate corrected by a deviation d(Cx)×S are used to address the bi-level image memory 103, thereby reading the image data for sub dots in each sub line. Therefore, the positional errors on the Y-axis (i.e., Y-coordinate) due to mounting errors or distortion or deformation of the LED head 21 may be corrected. It is to be noted that the value of S (the number of sub dots per group) in Eq. (2) is "2" and the value of G is "2."

The LED head 21 receives the read data RDATA, and emits light in the same way as the first embodiment, and the detailed description of the operation of the LED head 21 is omitted. The two strobe times T are related such that strobe time T for sub line #0 is twice as long as that for sub line #1.

Referring to FIG. 25, dots having the same exposure energy are formed during a logic level "0" of the strobe signal STB in accordance with bi-level image data read from the bi-level image memory 503. The dots are specified by the line #0, group #0, sub line #0, and "0" to "W−1" of the X-coordinate.

Then, dots having the same exposure energy are formed during a logic level "0" of the strobe signal STB in accordance with bi-level image data, the dots being specified by the line #0, group #0, sub line #1, and "0" to "W−1" of the X-coordinate.

Likewise, dots having the same exposure energy are formed during a logic level "0" of the strobe signal STB in accordance with bi-level image data until a dot specified by the line #L−1, group #2, sub line #1, and "0" to "W−1" of the X-coordinate is formed.

FIG. 26 illustrates the patterns of sub dots rendered at in 10 different halftone levels.

The duration of the strobe time T for sub line #0 is such that dots in sub line #0 are small. The duration of the strobe time T for sub line "1" is such that dots in sub line #1 are large.

For example, assume that a halftone level of "5" of the image data rendered at 10 halftone levels is printed at a line #R and at a coordinate "X" on the X-axis. The bi-level data is printed as shown in FIG. 26. In other words, when the group is #0, the sub line is #0, a small dot is printed.

When the group is #0 and the sub line is #1, a large dot is printed.

When the group is #1 and the sub line is #0, no dot is printed.

When the group is #1 and the sub line is #1, a large dot is printed.

When the group is #2 and the sub line is #0, no dot is printed.

When the group is #2 and the sub line is #1, no dot is printed.

As described above, pixels rendered at 10 halftone levels are formed by combining two groups, each group including a large sub dot and/or a small sub dot.

Figure 27A:
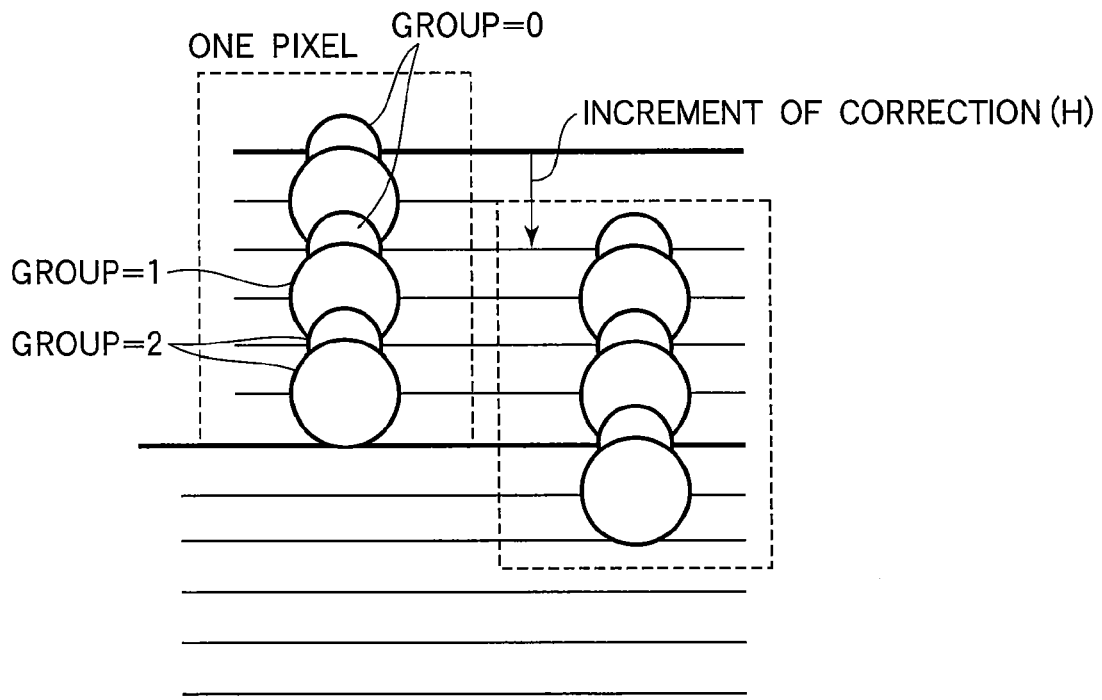
FIG. 27A illustrates correction performed in the third embodiment such that the positions of sub dots are moved by a minimum distance.
Figure 27B:
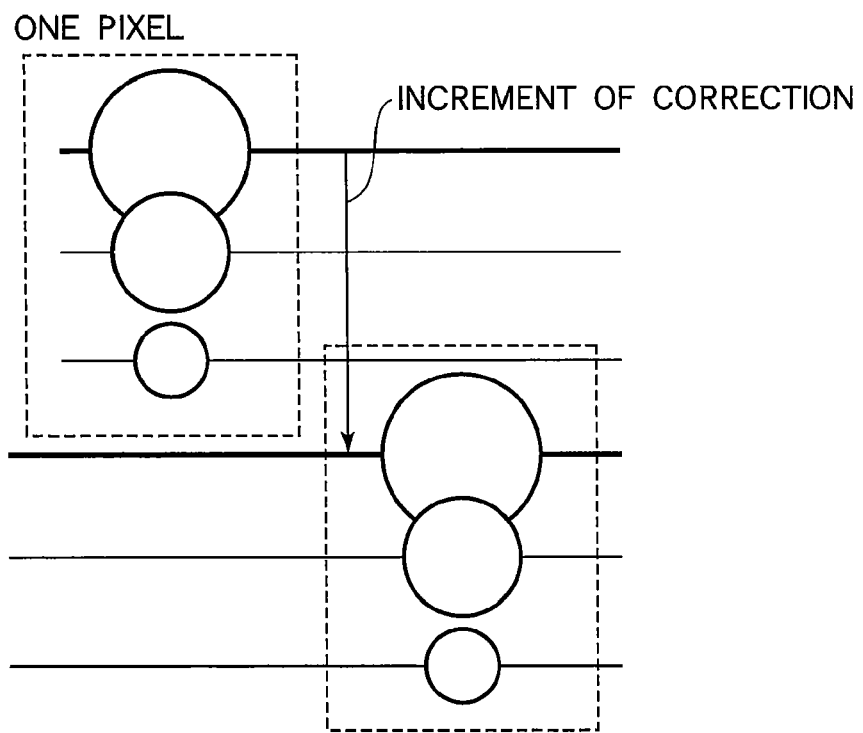
FIG. 27B illustrates correction performed by using a conventional method such that the positions of sub dots are moved by a minimum distance.

FIG. 27A illustrates correction performed in the third embodiment such that the positions of sub dots are moved by a minimum distance. FIG. 27B illustrates correction performed by using a conventional method such that the positions of sub dots are moved by a minimum distance.

Referring to FIG. 27A, the bi-level image data is read from the bi-level image memory 503 while also correcting the positions of sub dots on the Y-axis by a correction d(Cx)×S. Because the correction is made in increments of a group, the correction is such that the respective sub dots are moved in increments of the spacing H between adjacent groups.

It is to be noted that when the position of sub dots on the Y-axis is corrected, the sub dots are moved while maintaining the relative position of the sub dots.

In the third embodiment, each pixel is formed of three groups of sub dot, each of three groups including a large sub dot and/or a small sub dot. This configuration allows the sub dots to be moved in increments of ⅓ of the spacing H between the adjacent groups. In contrast, the pixel of the comparative example (FIG. 20B) is formed of three sub dots having three different sizes. Therefore, correction can only be made by moving the sub dots in increments of the spacing between the two adjacent lines.

The image forming apparatus of the third embodiment accomplishes the correction of the position of sub dots by moving the sub dots in increments of ⅓ of the spacing between adjacent lines while minimizing demerits such as deterioration of printing speed and an increase of memory capacity. This permits minimizing of color shift in multi-color printing more than the first and second embodiments.

Fourth Embodiment

Figure 28:
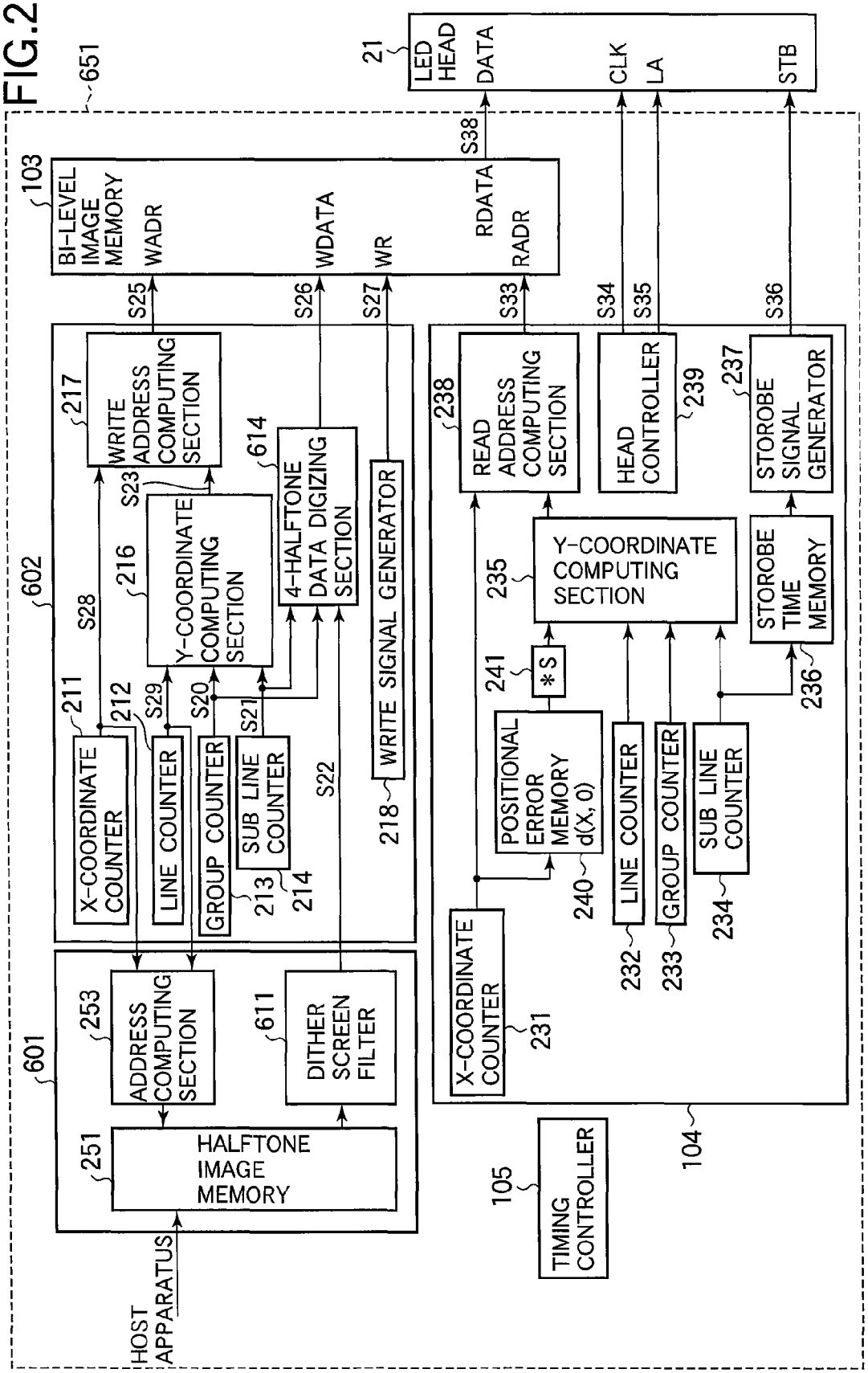
FIG. 28 is a block diagram illustrating the sections in a controller of a fourth embodiment.

FIG. 28 is a block diagram illustrating the sections in a controller 651 of a fourth embodiment. The controller 651 differs from the controller 51 of the first embodiment in that a pixel is rendered at 4 halftone levels.

Thus, elements for the controller 651 similar to those of the controller 51 (FIG. 2) of the first embodiment have been given the same reference numerals, and their detailed description is omitted.

The controller 651 operates in the same way as the first embodiment except that images are halftoned at 4 levels instead of 7 levels. The operation of the controller 651 will be described.
{Writing Bi-Level Image}
The 8-bit image data rendered at 256 halftone levels in the halftone image memory 251 is read sequentially from a data processing section 601, being read from the left end sub dot to the right end sub dot on a sub line in FIG. 4. The dither screen filter 611 converts the image data rendered at 256 halftone levels into image data rendered at 4 halftone levels. The digitizing section 614 converts the image data rendered at 4 halftone levels, received from the data processing section 601, into digital form. The digitized image data is stored into the bi-level image memory 103 in sequence. In this manner, the image data received from the host apparatus is converted into digitized data for one page of the paper 17.

The image data halftoned at 4 levels, produced by the dither screen filter 611, is digitized into digital form by the digitizing section 614. The digitized image data is then written into the bi-level image memory 103. The configuration of the fourth embodiment will be described primarily in terms of portions different from the first embodiment, and the description of portions common to the first embodiment is omitted.

The controller 651 performs digitizing process according to the timing chart in FIG. 8. The digitizing section 614 converts the image data (S22) halftoned at 4 levels into the write data WDATA (S26) in accordance with a truth table in FIG. 24, and outputs the write data WDATA (S26) to the bi-level image memory 103 in sequence. Concurrently, the write signal generator 218 outputs the write signal to the bi-level image memory 103, so that the bi-level image data is written into the bi-level image memory 103.

For example, assume that a halftone level of "2" of the image data rendered at 4 halftone levels is written into the bi-level image memory 103 according to the truth table in FIG. 29.

In other words, when the group is #0 and the sub line is #0, a logic level "0" is written.

When the group is #0 and the sub line is #1, a logic level "1" is written.

When the group is #1 and the sub line is #0, a logic level "0" is written.

When the group is #1 and the sub line is #1, a logic level "0" is written. {Printing Image Data}

Printing is performed in exactly the same way as performed by the data outputting section 104 in the first embodiment, and therefore the detailed description is omitted. Thus, only printing of image data rendered at 4 halftone levels will be described.

FIG. 30 illustrates the patterns of sub dots for the respective halftone levels when printing of image data rendered at 4 halftone levels is performed according to the timing chart in FIG. 10.

For example, a halftone level of "2" of the image data halftoned at 4 levels is printed as follows:

The duration of the strobe time T for sub line #0 is such that dots in sub line #0 are small. The duration of the strobe time T for sub line #1 is such that dots in sub line #1 are large.

When the group counter is "0" and the sub line counter is "0," no dot is printed.

When the group counter is "0", the sub line counter is "1," a large dot is printed.

When the group counter is "1" and the sub line counter is "0," no dot is printed.

When the group counter is "1" and the sub line counter is "1," no dot is printed.

Figure 31A:
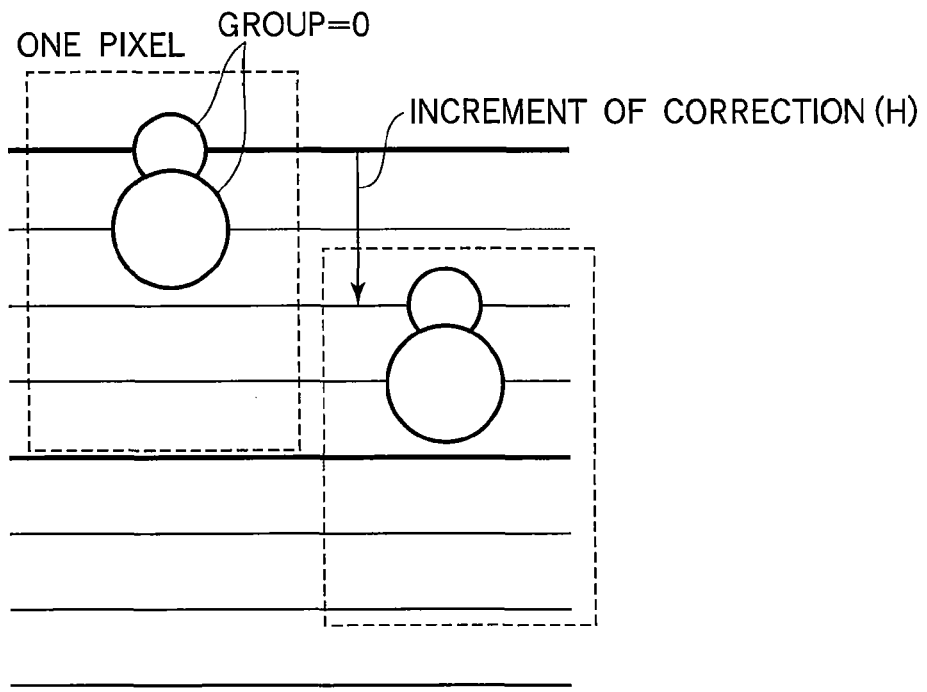
FIG. 31A illustrates the correction performed in the fourth embodiment such that the positions of sub dots are moved by a minimum distance.
Figure 31B:
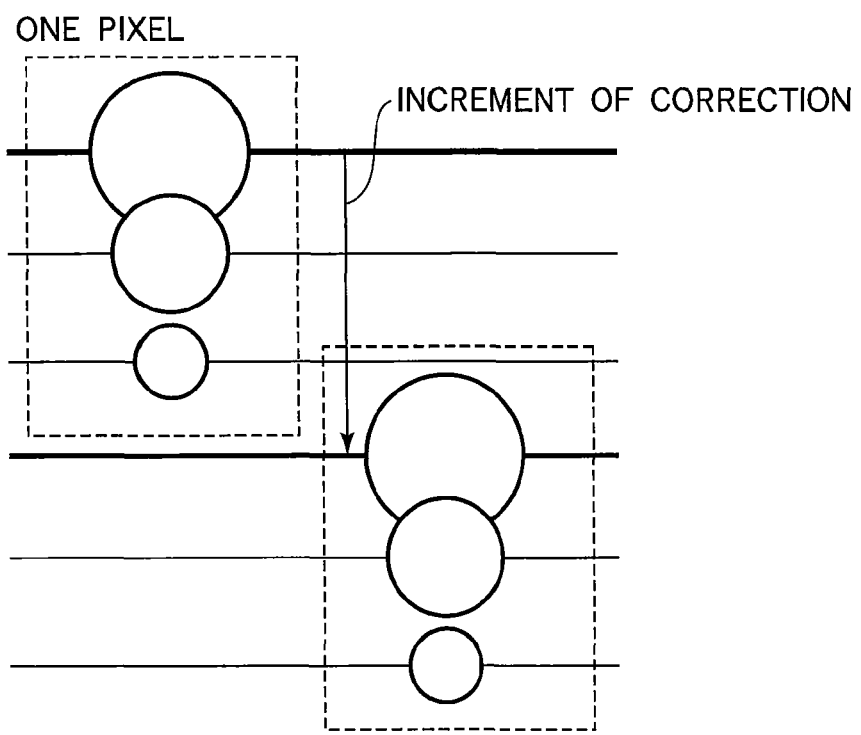
FIG. 31B illustrates a comparative example in which the correction of the position of sub dots is made using a conventional method such that the positions of sub dots are moved by a minimum distance.
Figure 32:
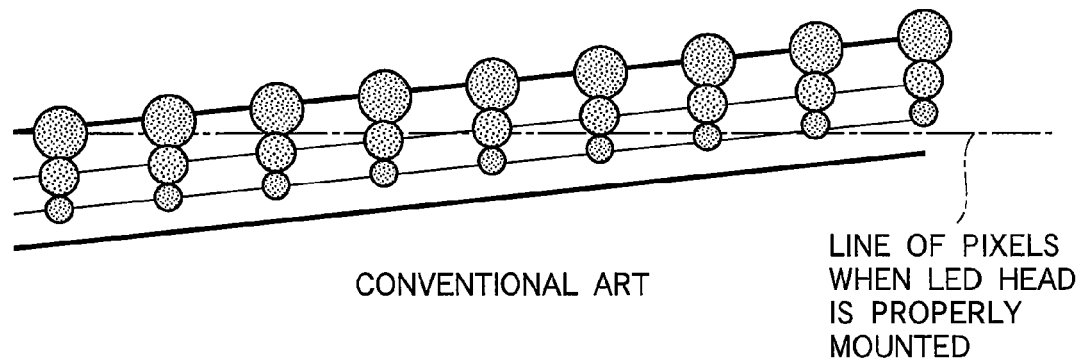
FIG. 32 illustrates dots printed on paper in conventional halftoning without correction when an LED head is misaligned so that the LED head extends at an angle with a rotational axis of a photoconductive drum.
Figure 33:
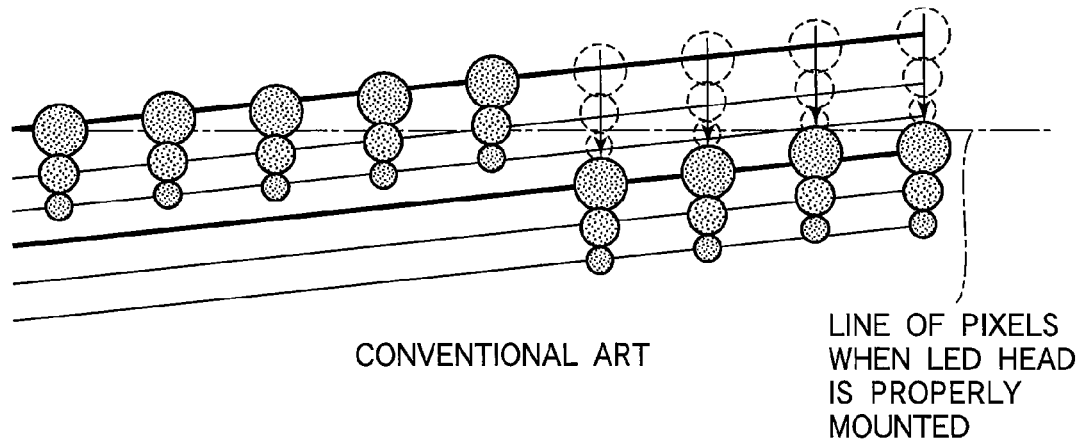
FIG. 33 illustrates one way of correcting the positional errors of sub dots in which the positions of sub-dots indicated by dotted lines are corrected by 3 sub-lines.

FIG. 31A illustrates the correction performed in the fourth embodiment such that the positions of sub dots are moved by a minimum distance. FIG. 31B illustrates a comparative example in which the correction of the position of sub dots is made using a conventional method such that the positions of sub dots are moved by a minimum distance.

Referring to FIG. 31A, the bi-level image data is read from the bi-level image memory 503 while also correcting the positions of sub dots on the Y-axis (i.e., Y-coordinate) by a correction d(Cx)×S. Because the correction is made in increments of a group (i.e., two sub lines), the correction is such that the respective sub dots are moved in increments of the spacing H between adjacent groups.

It is to be noted that when the position of sub dots is corrected, the sub dots are moved while maintaining the relative position of the sub dots.

In the fourth embodiment, each pixel is formed of two groups of sub dots. Each of the two groups includes a large sub dot and/or a small sub dot. This configuration allows the sub dots to be moved in increments of ½ of the spacing H between the adjacent lines. In contrast, the pixel of the comparative example (FIG. 20B) is formed of three sub dots having three different sizes. Therefore, correction can only be made by moving the sub dots in increments of the spacing between the two adjacent lines.

The image forming apparatus of the fourth embodiment provides highly accurate correction of the positions of sub dots by moving the sub dots in increments of ½ of the spacing between adjacent lines while minimizing demerits such as a decrease of printing speed and an increase of memory capacity. This permits minimizing of color shift in multi-color printing. Because the number of halftone levels is smaller in the fourth embodiment than in the first embodiment, the burden on the dither screen filter may be reduced when the dither screen filter is implemented in software, lending itself to a low cost image forming apparatus.

Industrial Applicability

As described above, for high definition image formation, the number of sub lines may be increased to increase the halftone levels. The number of groups may be increased to increase precision in correction of the position of sub dots in the advance direction. In the fourth embodiment, image data contains many dots of logic level "0". Therefore, the image data may be compressed before it is stored into a memory, and may be expanded when it is read from the memory, thereby saving the memory capacity. While the embodiments have been described in terms of the positional errors of an LED head due to the fact that the LED head is mounted to extend at an angle with the traverse direction (direction of rotational shaft of the photoconductive drum), the embodiments may also be applicable to correction of the positional errors of an LED head caused by deformation of the LED head. While the correction has been made for each dot in the embodiments, an amount of position correction may be stored for each of sets of a plurality of consecutive dots so that correction may be made on a set-by-set basis.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. An image forming apparatus that prints first image data rendered at a first number of halftone levels, comprising:
   a dot forming section that forms lines of pixels on a print medium, each of the lines including a number of groups of sub lines, each of the sub lines including sub dots, wherein the number of groups are aligned such that each of the sub lines extends in a first direction substantially perpendicular to a second direction in which the print medium advances; and
   a controller that controls said dot forming section such that a selected number of sub dots in the second direction are combined to form the pixel based on second image data rendered at a second number of halftone levels, sub dots on the same sub line having the same exposure energy and sub dots on different sub lines in the same pixel having different exposure energies.

2. The image forming apparatus according to claim 1, wherein said dot forming section includes:
   a halftone level converting section that converts the second image data rendered at the second number of halftone levels into the first image data rendered at the first number of halftone levels;
   a digitizing section that digitizes the first image data into bi-level image data;
   a bi-level image memory that stores the bi-level image data;
   an exposing section that causes light-emitting elements to emit light in accordance with the bi-level image data;
   a data outputting section that reads the bi-level image data from said bi-level image memory and that produces signals that represents corresponding ones of the different exposure energies, said data outputting section sending the bi-level data and the signals to said exposing section.

3. The image forming apparatus according to claim 2, wherein the second image data includes a third number of lines of pixels for one page of the print medium, each of the third number of lines including a fourth number of pixels that are aligned in the first direction.

4. The image forming apparatus according to claim 3, wherein the third number of lines includes a fifth number of sub lines;
   wherein each of the sub dots on the sub lines is printed at a position on the print medium given by a first coordinate in the first direction and a second coordinate in the second direction;
   wherein when said data outputting section reads the bi-level data from said bi-level image memory, the position in the second direction is corrected by a correction value corresponding to the position, the correction value being produced in increments of a spacing between adjacent groups.

5. The image forming apparatus according to claim 1, wherein the first number of halftone levels, the number of groups of sublines in each of the lines of pixels, and a number of sub lines in each of the groups are related such that $$M \leq (2^S - 1) \times G + 1$$

where M is the first number of halftone levels, G is the number of groups of sub lines in each of the lines of pixels, and S is the number of sub lines in each of the groups.

6. The image forming apparatus according to claim 5, wherein the number of groups is 2, the number of sub lines in each group is 2, and the first number of halftone levels is 7.

7. The image forming apparatus according to claim 5, wherein the number of groups is 2, the number of sub lines in each group is 3, and the first number of halftone levels is 15.

8. The image forming apparatus according to claim 5, wherein the number of groups is 3, the number of sub lines in each group is 2, and the first number of halftone levels is 10.

9. The image forming apparatus according to claim 5, wherein the number of groups is 2, the number of sub lines in each group is 2 and the first number of halftone levels is 4.

* * * * *

UNITED STATES PATENT AND TRADEMARK OFFICE
CERTIFICATE OF CORRECTION

PATENT NO. : 7,924,467 B2
APPLICATION NO. : 11/686488
DATED : April 12, 2011
INVENTOR(S) : Nobuo Wakasugi Page 1 of 1

It is certified that error appears in the above-identified patent and that said Letters Patent is hereby corrected as shown below:

Title Page, Item (12)

Change from "Waksugi" to "Wakasugi"

Title Page, Item (75) Inventor:

Change "Nobuo Waksugi" to "Nobuo Wakasugi"

Signed and Sealed this
Thirty-first Day of July, 2012

David J. Kappos
*Director of the United States Patent and Trademark Office*